(12) United States Patent
Kiuchi et al.

(10) Patent No.: US 6,730,402 B2
(45) Date of Patent: May 4, 2004

(54) FLAME-RETARDANT EPOXY RESIN COMPOSITION AND LAMINATE MADE WITH THE SAME

(75) Inventors: Yukihiro Kiuchi, Minato-Ku (JP); Masatoshi Iji, Minato-Ku (JP)

(73) Assignee: NEC Corporation, Tokyo (JP)

( * ) Notice: Subject to any disclaimer, the term of this patent is extended or adjusted under 35 U.S.C. 154(b) by 66 days.

(21) Appl. No.: 10/070,827

(22) PCT Filed: Dec. 5, 2000

(86) PCT No.: PCT/JP00/08595

§ 371 (c)(1),
(2), (4) Date: Mar. 11, 2002

(87) PCT Pub. No.: WO01/42360

PCT Pub. Date: Jun. 14, 2001

(65) Prior Publication Data

US 2003/0152776 A1 Aug. 14, 2003

(30) Foreign Application Priority Data

Dec. 8, 1999 (JP) ............................................. 11-349440
Nov. 28, 2000 (JP) ........................................ 2000-361170

(51) Int. Cl.$^7$ ........................ B32B 27/38; B32B 27/04; C09K 21/00; C08L 63/00; C08L 83/04
(52) U.S. Cl. ....................... 428/414; 428/413; 428/447; 428/448; 523/400; 523/440; 523/442; 523/457; 523/458; 525/476; 528/43; 252/609
(58) Field of Search ............................... 428/297.4, 413, 428/320.2, 414, 416, 418, 447, 448, 450; 523/400, 401, 440, 442, 457, 458; 525/474, 476, 523, 534; 528/43; 252/609

(56) References Cited

U.S. PATENT DOCUMENTS 5,955,184 A 9/1999 Honda et al.
6,120,858 A * 9/2000 Hirano et al. ............... 428/1.53
6,162,878 A * 12/2000 Osada et al. ................. 525/481
6,242,110 B1 * 6/2001 Iwasaki et al. .............. 428/620

FOREIGN PATENT DOCUMENTS

| JP | 5-318653 | 12/1993 | |
| JP | 05-318653 | * 12/1993 | ........... B32B/15/08 |
| JP | A 9-208666 | 8/1997 | |
| JP | 10-152547 | 6/1998 | |
| JP | 10-279782 | 10/1998 | |
| JP | 11-12439 | 1/1999 | |
| JP | 11-140277 | 5/1999 | |
| JP | 88200 | 7/1999 | |
| JP | A 11-179841 | 7/1999 | |
| JP | 11-181305 | 7/1999 | |
| JP | 11-246741 | 9/1999 | |
| JP | 02 975349 B | 11/1999 | |
| JP | A 11-323089 | 11/1999 | |
| JP | 2000-53845 | 2/2000 | |
| JP | 2000-129092 | 5/2000 | |
| JP | A 2001-48957 | 2/2001 | |
| JP | A 2001-89641 | 4/2001 | |

* cited by examiner

Primary Examiner—Robert Dawson
Assistant Examiner—Michael J Feely
(74) Attorney, Agent, or Firm—Young & Thompson

(57) ABSTRACT

A flame-retardant epoxy resin composition includes an epoxy resin, a curing agent, and a metal hydroxide, wherein the curing agent as a phenolic resin (C) containing, in the molecular chain, structural units derived from a phenol (A) and structural units derived from an aromatic compound (B) other than the phenol (A), or the epoxy resin is a novolac epoxy resin CD) obtained by subjecting the phenolic hydroxyl groups of the phenolic resin (C) to etherification with glycidyl. The composition has a high degree of flame retardancy.

72 Claims, 1 Drawing Sheet

FLAME-RETARDANT EPOXY RESIN COMPOSITION AND LAMINATE MADE WITH THE SAME

TECHNICAL FILED

The present invention relates to a flame-retardant epoxy resin composition superior in flame retardancy and safety, as well as to a varnish solution, a prepreg and a laminate all made with the composition.

BACKGROUND ART

In an epoxy resin composition required to have flame retardancy for fire prevention, there have generally been used a halogen-based flame retardant and, as an auxiliary flame retardant, antimony trioxide.

Use of such a flame retardant and such an auxiliary flame retardant in an epoxy resin composition gives rise to a safety problem and, moreover, incurs metal corrosion. For these reasons, such an epoxy resin composition has had problems in application. For example, when such an epoxy resin composition is used as an insulating material for electronic part, there have occurred, in some cases, reduction in corrosion resistance of wiring particularly at high temperatures and resultant deterioration of reliability of the electronic part. Therefore, it has been desired to develop an epoxy resin composition using neither halogen-based flame retardant nor antimony trioxide.

As a means for imparting flame retardancy to an epoxy resin composition without using any halogen-based flame retardant or the like, it is known to compound a metal hydroxide in an epoxy resin composition. Expression of flame retardancy by metal hydroxide is due to the ignition-preventing action by the temperature decrease (endothermic reaction) of cured resin and is regarded as an auxiliary means for imparting flame retardancy. Therefore, use of a large amount of the metal hydroxide is required in order to obtain sufficient flame retardancy by such an endothermic reaction. This results in a significant reduction in moldability, etc. when such an epoxy resin composition is used in applications such as electronic part and the like, and the actual use of the epoxy resin composition has been difficult.

When a metal hydroxide is used in a large amount in an epoxy resin composition, particularly for production of a flame-retardant laminate by impregnation of the resulting epoxy resin composition into a glass fiber or the like and subsequent curing of the composition, various problems arise. These problems are described below.

The first problem is reduction in the processability of the laminate obtained. With respect to this, for example, the pages 270 to 271 of "Latest Techniques of Flame Retardant and Flame Retardation (published on Jul. 30, 1999 from Technical Information Institute Co., Ltd.)" describe that addition of a large amount (75% by mass relative to total epoxy resin composition) of aluminum hydroxide can achieve UL 94 V-0, but such an addition amount is unrealistic in practical application and "gives rise to problems in punching and drilling in printed wiring board production as well as in soldering in parts mounting".

The second problem is increase in dielectric constant and reduction in moisture resistance and soldering heat resistance. While these properties must be maintained at sufficient levels in laminate applications, metal hydroxides are hygroscopic and have high dielectric constants; therefore, addition of a large amount of a metal hydroxide invites reduction in the above properties.

Thus, with the means of adding a metal hydroxide to an existing epoxy resin, it has been difficult to achieve a high degree of flame retardancy while keeping the properties required for laminate applications, at high levels.

Meanwhile, various studies have been made on imparting flame retardancy by change of the molecular structure of an epoxy resin or a curing agent. In JP-A-11-140277 is disclosed a flame-retardant-free epoxy resin composition used for encapsulation of semiconductor device, containing, as essential components, a phenolic resin of novolac structure containing, in the molecule, a biphenyl derivative and/or a naphthalene derivative, an epoxy resin of novolac structure containing, in the molecule, a biphenyl derivative and/or a naphthalene derivative, an inorganic filler and a curing accelerator.

In the above epoxy resin composition used for encapsulation of semiconductor device, the phenolic resin and the epoxy resin both having, in the structure, a polycyclic compound(s) such as biphenyl derivative, naphthalene derivative and/or the like are reacted to form a crosslinked structure; therefore, the composition, when ignited, shows rubber-like expansion at the surface to form a foamed layer. This foamed layer shields the supply of heat and oxygen to the unburnt portion, whereby a high degree of flame retardancy is expressed.

The above resin composition, however, is designed so as to fit an application of semiconductor device encapsulation and therefore, when used for applications such as laminate and the like, shows no sufficient flame retardancy. This is owing to the fact that since a laminate contains therein a substrate such as a woven and nonwoven glass fabric which prevents the deformation (expansion) of the resin component, formation of a sufficient amount of a stable foamed layer in the laminate during its ignition is difficult.

DISCLOSURE OF THE INVENTION

The present invention has been made in view of the above-mentioned situation and aims at providing a flame-retardant epoxy resin composition showing a high degree of flame retardancy and safety both of which have been unobtainable with the prior art.

The present invention aims, in particular, at allowing a flame-retardant epoxy resin composition used for production of a laminate, to have a high degree of flame retardancy while having the properties to be possessed by the laminate, i.e. processability, dielectric properties, moisture resistance, soldering heat resistance and the like.

In order to achieve the above aim, the present invention provides a flame-retardant epoxy resin composition comprising an epoxy resin, a curing agent and a metal hydroxide, wherein the curing agent is a phenolic resin (C) containing, in a molecular chain, a structural unit derived from a phenol (A) and a structural unit derived from an aromatic compound (B) other than the phenol (A).

The present invention also provides a flame-retardant epoxy resin composition comprising an epoxy resin, a curing agent and a metal hydroxide, wherein the epoxy resin is a novolac epoxy resin (D) obtained by glycidyletherifying a phenolic hydroxyl group of a phenolic resin (C) containing, in a molecular chain, a structural unit derived from a phenol (A) and a structural unit derived from an aromatic compound (B) other than the phenol (A).

The present invention also provides a flame-retardant epoxy resin composition comprising an epoxy resin, a curing agent and a metal hydroxide, wherein the curing agent is a phenolic resin (C) containing, in a molecular chain, a structural unit derived from a phenol (A) and a structural unit derived from an aromatic compound (B) other than the phenol (A), and the epoxy resin is a novolac epoxy resin (D) obtained by glycidyletherifying a phenolic hydroxyl group of a phenolic resin (C') containing, in a molecular chain, a structural unit derived from a phenol (A') and a structural unit derived from an aromatic compound (B') other than the phenol (A').

In the flame-retardant epoxy resin composition, the phenol (A), the aromatic compound (B) and the phenolic resin (C) may be the same with or different from the phenol (A'), the aromatic compound (B') and the phenolic resin (C'), respectively. Incidentally, the descriptions on the phenol (A), the aromatic compound (B) and the phenolic resin (C), made in this specification apply also to the phenol (A'), the aromatic compound (B') and the phenolic resin (C').

The present invention also provides an epoxy resin varnish solution obtained by dispersing the above flame-retardant epoxy resin composition in an organic solvent; a prepreg obtained by impregnating the above flame-retardant epoxy resin composition into a substrate and curing the impregnated composition; and a laminate obtained by laminating a plurality of the prepregs and hot-pressing them.

In the present invention, a phenolic resin and an epoxy resin having the above-mentioned particular structure, and a metal hydroxide are used in combination, whereby a high degree of flame retardancy is realized. By using, in particular, a combination of a phenolic resin of the above particular structure and an epoxy resin of the above particular structure, even higher flame retardancy is obtained.

The flame-retardant epoxy resin composition of the present invention comprises a phenolic resin (C) containing, in the molecular chain, structural units derived from a phenol (A) and structural units derived from an aromatic compound (B); and/or an epoxy resin (D) obtained by subjecting the phenolic hydroxyl groups of the phenolic resin (C) to etherification with glycidyl; and further comprises a metal hydroxide. Owing to the synergistic effect of these components, a high degree of flame retardancy is obtained as described below.

As mentioned in the section of the prior art, the cured material of an epoxy resin composition in which a phenolic resin (C) and/or an epoxy resin (D) both containing an aromatic compound (B) in the molecular skeleton, form a crosslinked structure, generates a decomposition gas inside when ignited, gives rise to rubber-like expansion of the surface resin layer, and form a stable foamed layer; thereby, flame retardancy is expressed. With such an action alone, however, no sufficient flame retardancy is obtained in the case of an epoxy resin composition used in, for example, a laminate containing a substrate such as a woven and nonwoven glass fabric, which hinders the deformation (expansion) of the resin component, because, in such an epoxy resin composition, efficient formation of a foamed layer capable of showing a high degree of flame retardancy is difficult.

Hence, in the flame-retardant epoxy resin composition of the present invention, there are used an epoxy resin of the above-mentioned particular structure, a curing agent of the above-mentioned particular structure and a metal hydroxide. Owing to the synergistic effect of these components, strikingly high flame retardancy unobtainable with the prior art is obtained. The reasons are not clear; however, the present flame-retardant epoxy resin composition is considered to express its flame retardancy based on the following mechanism.

The cured material of the present flame-retardant epoxy resin composition, when ignited, gives rise to thermal decomposition of the metal hydroxide to generate water vapor. This water vapor allows the cured resin material softened by the heat of ignition to deform and expand, whereby formation of a foamed layer is promoted. Consequently, a sufficient amount of a foamed layer can be formed during ignition even when the present epoxy resin composition is used in a structure containing a substrate such as a woven and nonwoven glass fabric, which hinders the deformation (expansion) of the resin component. Further, this foamed layer has a high hot strength and is hardly broken by heat because of the particular crosslinked structure brought about by a particular epoxy resin and a particular curing agent; moreover, is filled with water vapor, etc. inside; therefore, can effectively shield heat and oxygen and can effectively act as a ignition-preventing layer.

The metal hydroxide, when ignited, is converted into a metal oxide and this metal oxide remains uniformly in the resin material. The metal oxide is considered to act as a support and allow the foamed layer to have a uniform size. Thus, the metal hydroxide is considered to allow the foamed layer to have a preferred structure and accordingly higher ignition preventability.

As mentioned above, in the present invention, an epoxy resin of particular structure, a curing agent of particular structure and a metal hydroxide are used in combination; thereby, formation of a flamed layer of high hot strength is promoted, the foamed layer is filled with water vapor inside and is allowed to have ignition preventability, and the metal oxide converted from the metal hydroxide becomes a support and allows the foamed layer to have a structure suitable for ignition prevention; as a result, a high degree of flame retardancy is considered to be realized.

In the present invention, since a metal hydroxide is used for such a purpose, its addition amount can be small to obtain sufficient flame retardancy, as compared with the prior art in which a metal hydroxide is used simply for temperature lowering.

In the present epoxy resin composition, addition of, in particular, a silicone compound having a branched structure main chain and containing, in the structure, aromatic compound-derived group can allow the epoxy resin composition to have significantly improved flame retardancy. The added silicone compound reacts with the epoxy resin and the curing agent in the epoxy resin composition to form a flame-retardant substance superior in thermal decomposition resistance; therefore, when the cured resin material is ignited, a foamed layer more resistant to foam breakage is formed and higher flame retardancy can be attained. Further, the addition of the silicone compound enables reduction in the amount of the metal hydroxide used, which allows effective prevention of the reduction in the moldability and electrical properties (dielectric properties) of the epoxy resin composition, because of lowering the metal hydroxide.

BEST MODE FOR CARRYING OUT THE INVENTION

Figure 1:
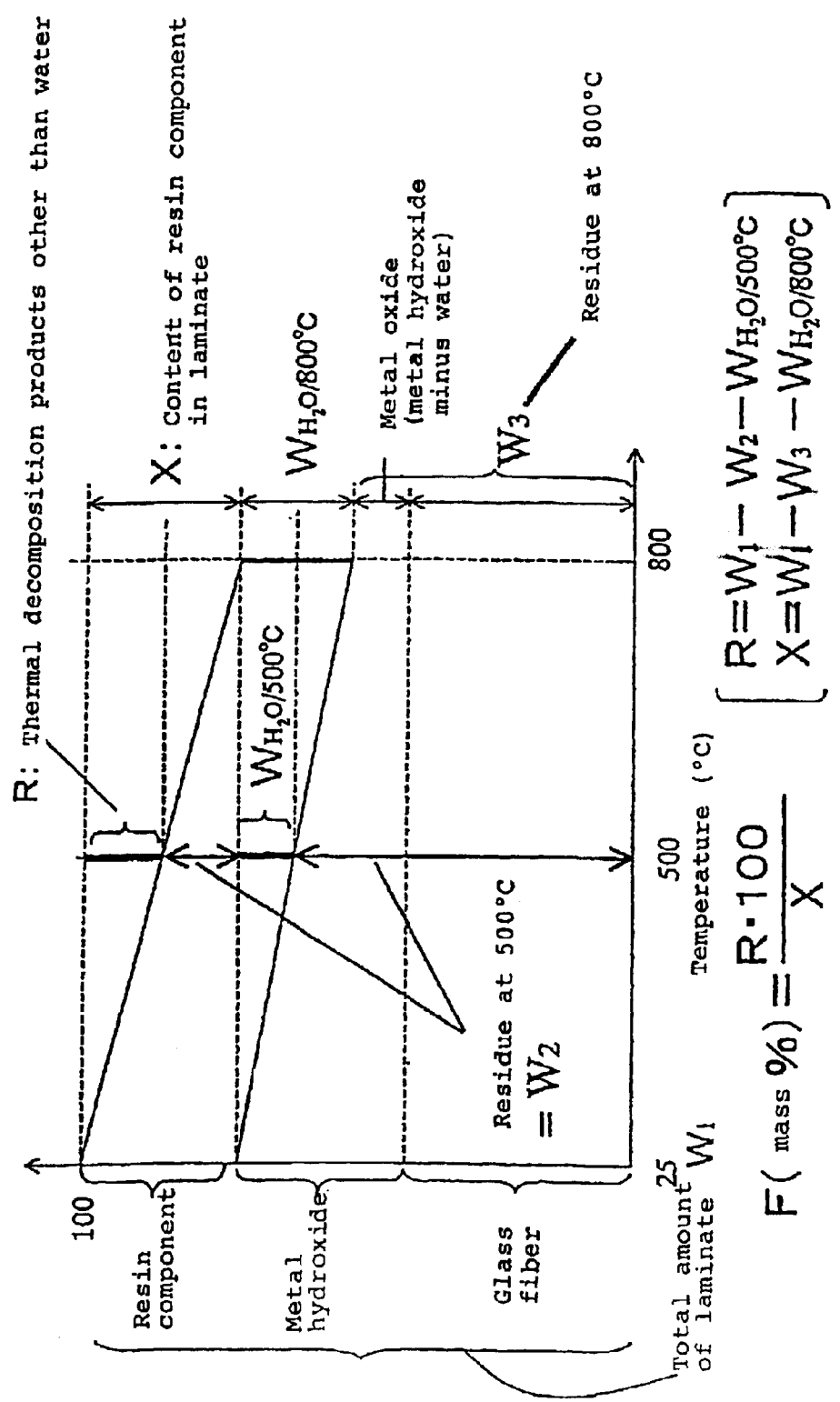
FIG. 1 is a drawing for explaining the parameters used in the present invention.

The phenol (A) used in the present invention is not particularly restricted as long as it is an aromatic compound having phenolic hydroxyl group. As the phenol (A), there can be mentioned, for example, phenol; naphthols such as α-naphthol, β-naphthol and the like; bisphenol fluorene type phenols; alkylphenols such as cresol, xylenol, ethylphenol, butylphenol, nonylphenol, octylphenol and the like; polyhydric phenols such as bisphenol A, bisphenol F, bisphenol S, resorcin, catechol and the like; phenylphenol; and aminophenol. These phenols can be used singly or in combination of two or more kinds.

In the present invention, the aromatic compound (B) is one or more kinds of aromatic compounds other than the phenol (A). The aromatic compound (B) is not particularly restricted. As the aromatic compound (B), there can be mentioned, for example, biphenyl and its derivatives, benzene and its derivatives, diphenyl ether and its derivatives, naphthalene and its derivatives, anthracene and its derivatives, fluorene and its derivatives, bisphenol fluorene and its derivatives, bisphenol S and its derivatives, bisphenol F and its derivatives and bisphenol A and its derivatives. Of these, biphenyl and its derivatives and benzene and its derivatives are used preferably. The reason is that since they give very high flame retardancy and moreover are superior in hydrophobicity, their use can give a resin composition significantly improved also in moisture resistance. In particular, an aromatic compound (B) containing biphenyl derivative is very effective in flame retardancy improvement and is preferred. The reason is not clear but is considered to be that the cured material of a resin containing biphenyl derivative easily causes foaming and the biphenyl derivative itself has a high flash point. That is, it is considered that when a resin contains biphenyl derivative, the resin, when cured, gives a crosslinked structure longer in distance between crosslink sites, as compared with resins containing benzene derivative or the like, resultantly causes foaming easily when ignited, and shows higher flame retardancy.

When the resin composition of the present invention is ignited, a gaseous thermal decomposition product is generated and allows the resin surface to foam. The thermal decomposition product itself is resistant to ignition, and this is considered to be one factor contributing to flame retardancy. When a resin composition containing biphenyl derivative is ignited, biphenyl is generated and its high flash point (110° C. as compared with −10° C. of benzene) is very probably another factor contributing to flame retardancy.

The aromatic compound (B) preferably contains $C_{1-6}$ chain structure group having unsaturation or $C_{1-6}$ substituted or unsubstituted alkyl group.

As the chain structure group having unsaturation, allyl group can be mentioned. As the $C_{1-6}$ alkyl group, there can be mentioned methyl group, ethyl group, propyl group, etc.

In the present invention, the phenolic resin (C) is not particularly restricted as long as it is a novolac structure phenolic resin containing the phenol (A) and the aromatic compound (B) other than phenols. As the phenolic resin (C), there can be mentioned, for example, phenol biphenyl aralkyl type resins, phenol phenylene aralkyl type resins, phenol diphenyl ether aralkyl type resins, naphthalene-containing phenolic novolac type resins, anthracene-containing phenolic novolac type resins, biphenylene-containing phenolic novolac type resins, fluorene-containing phenolic novolac type resins, bisphenol fluorene-containing phenolic novolac type resins, bisphenol S-containing phenolic novolac type resins, bisphenol F-containing phenolic novolac type resins, and bisphenol A-containing phenolic novolac type resins. These phenolic resins can be used singly or in combination of two or more kinds.

Specific examples of the phenolic resin (C) are shown below. The phenolic resin (C) of the present invention is not restricted to these examples.

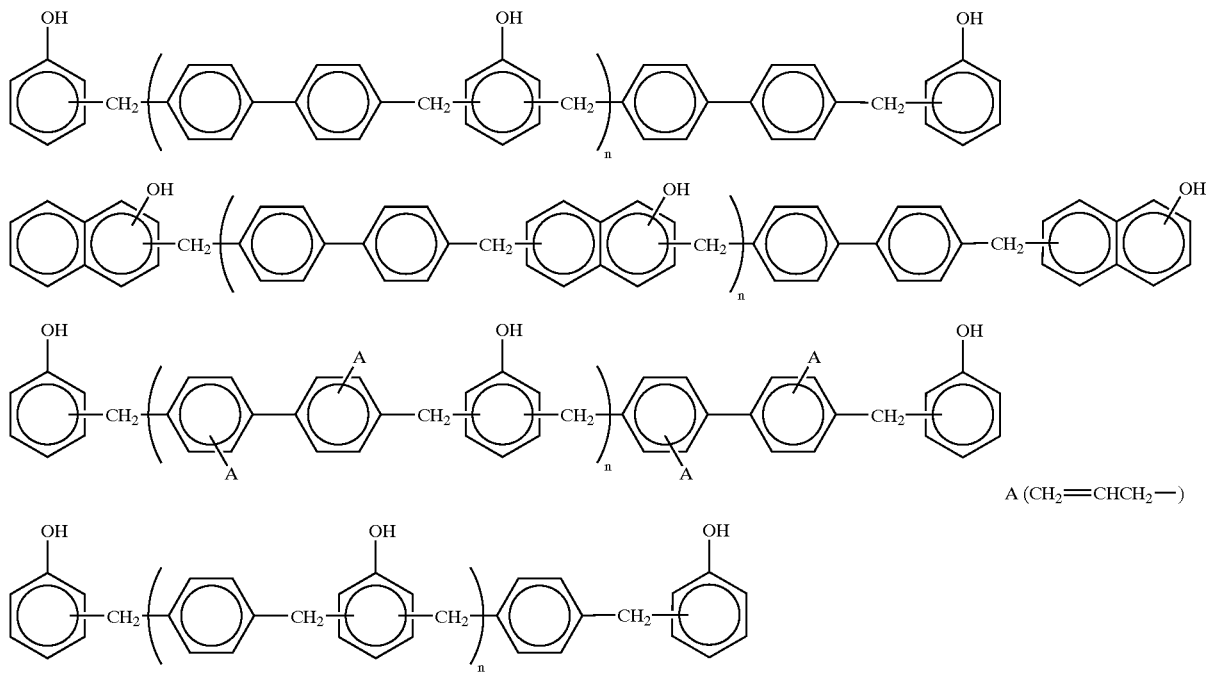

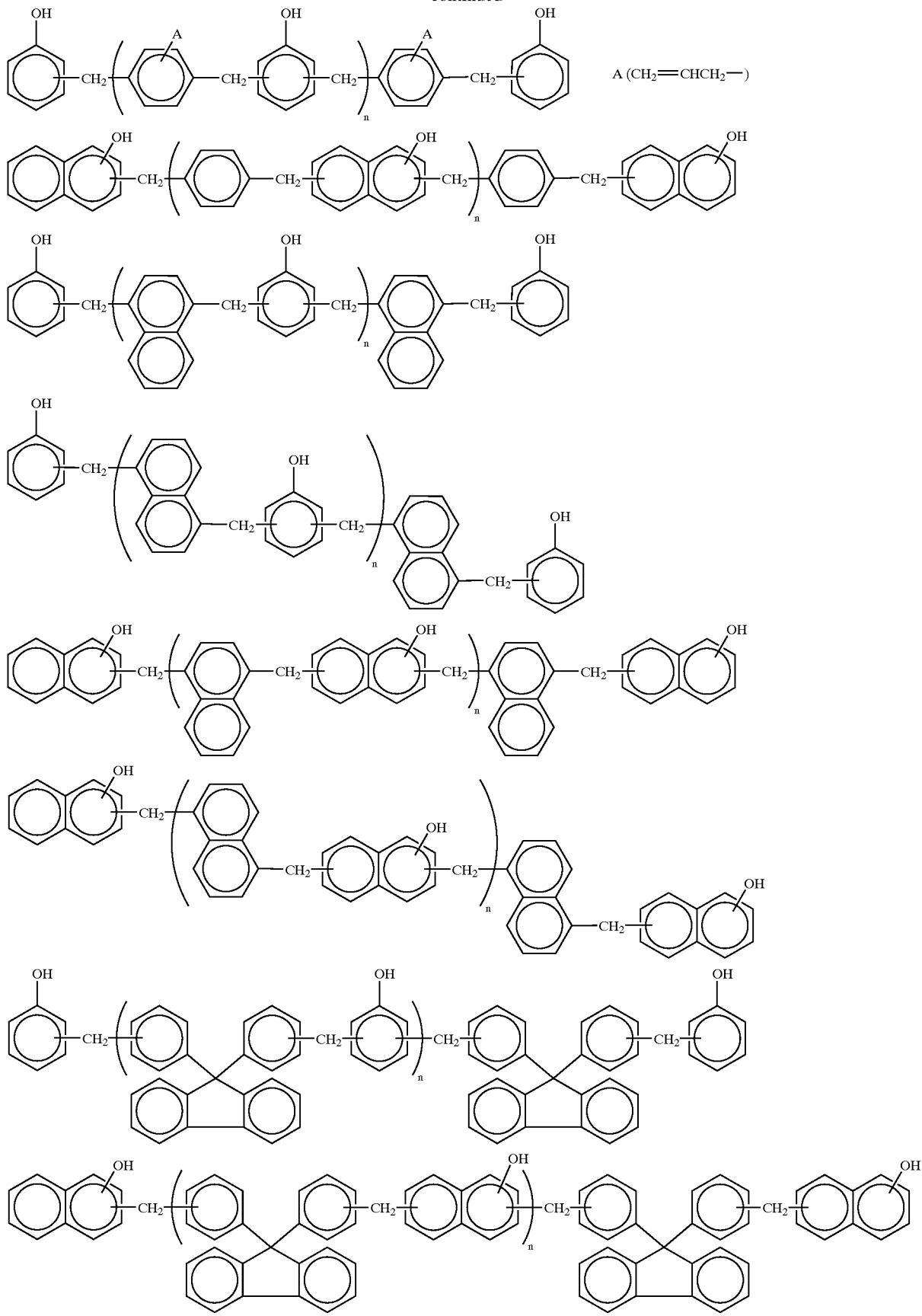

-continued

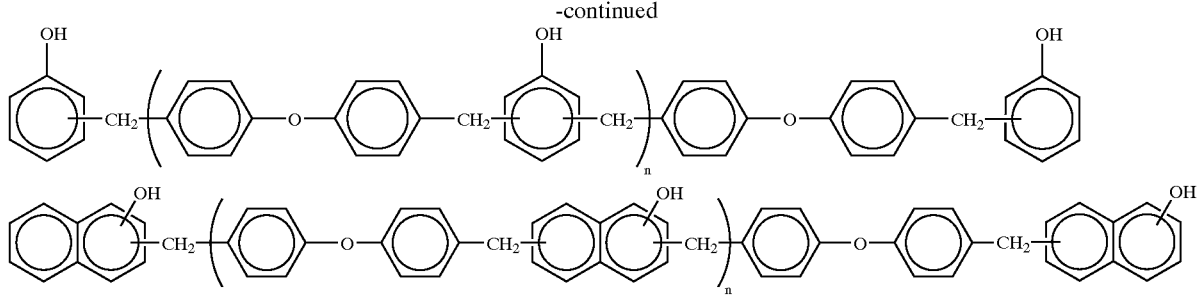

Of these, preferred are phenol biphenyl aralkyl type resins or phenol phenylene aralkyl type resins, where the aromatic compound (B) is biphenyl or its derivative, or benzene or its derivative. In these cases, there can be obtained an epoxy resin composition having an adequately low crosslink density and, when the composition is ignited, a rubber-like foamed layer of high thermal decomposition resistance is formed in a more preferred structure. Since biphenyl or its derivative, or benzene or its derivative is superior in hydrophobicity, the resin composition containing such a compound is improved also in moisture resistance.

The phenolic resin (C) of the present invention preferably has a recurring unit represented by either of, for example, the following formulas (I) to (IV).

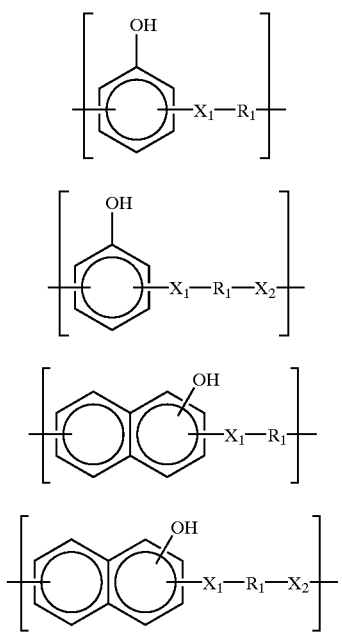

(wherein $X_1$ and $X_2$ are each independently a $C_{1-6}$ unsaturated chain structure linking group, or a $C_{1-6}$ substituted or unsubstituted alkylene group; and $R_1$ is a phenylene group, a biphenylene group or a group derived from these groups).

By using a resin having such recurring units, the resulting resin composition, when ignited, can form a rubber-like foamed layer of high thermal decomposition resistance in a more preferred structure; further, the resin composition is improved also in moisture resistance.

In the flame-retardant epoxy resin composition of the present invention, a phenolic resin other than the phenolic resin (C) may be used in combination with the phenolic resin (C). In that case, the content of the phenolic resin (C) relative to the total amount of the phenolic resins is preferably 5% by mass or more, more preferably 30% by mass or more. Too low a content may result in insufficient flame retardancy.

In the flame-retardant epoxy resin composition of the present invention, a phenolic resin other than the phenolic resin (C) and an amine compound can be used as a curing agent in combination with the phenolic resin (C).

The phenolic resin usable in combination is not particularly restricted. As such a phenolic resin, there can be mentioned, for example, phenol biphenyl triazine type resins, phenol phenylene triazine type resins, phenol triazine type resins, biphenyl-4,4'-dihydroxyl ether, 3,31,5,5'-tetramethylbiphenyl-4,4'-dihydroxyl ether, tetraphenylolethane, trisphenylolethane, phenolic novolac resins, cresol novolac resins, bisphenol A type resins, bisphenol F type resins, bisphenol S type resins, polyphenol type resins, aliphatic phenolic resins, aromatic ester type phenolic resins, alicyclic ester type phenolic resins and ether ester type phenolic resins.

The amine compound usable in combination is not particularly restricted. As such an amine compound, there can be mentioned, for example, diaminodiphenylmethane, diethylenetriamine and diaminodiphenylsulfone. These phenolic resins or amine compounds can be used singly or in admixture of few to several kinds. Of these, phenol biphenyl triazine type resins, phenol phenylene triazine type resins and phenol triazine type resins are particularly preferred because they can impart high flame retardancy.

In the present invention, the novolac type epoxy resin (D) is a novolac type epoxy resin obtained by subjecting the phenolic hydroxyl groups of a phenolic resin (C) containing, in the molecular chain, structural units derived from a phenol (A) and structural units derived from an aromatic compound (B) other than the phenol (A), to etherification with glycidyl. As such a novolac type epoxy resin, there can be mentioned, for example, phenol biphenyl aralkyl type epoxy resins, phenol phenylene aralkyl type epoxy resins, phenol diphenyl ether aralkyl type epoxy resins, naphthalene-containing novolac type epoxy resins, anthracene-containing novolac type epoxy resins, biphenylene-containing novolac type epoxy resins, fluorene-containing novolac type epoxy resins, bisphenol fluorene-containing novolac type epoxy resins, bisphenol S-containing novolac type epoxy resins, bisphenol F-containing novolac type epoxy resins, and bisphenol A-containing novolac type resins. These epoxy resins can be used singly or in combination of two or more kinds.

Specific examples of the novolac type epoxy resin (D) are shown below. The novolac type epoxy resin (D) of the present invention is not restricted to these examples. In the following formulas, "G" refers to a glycidyl group.

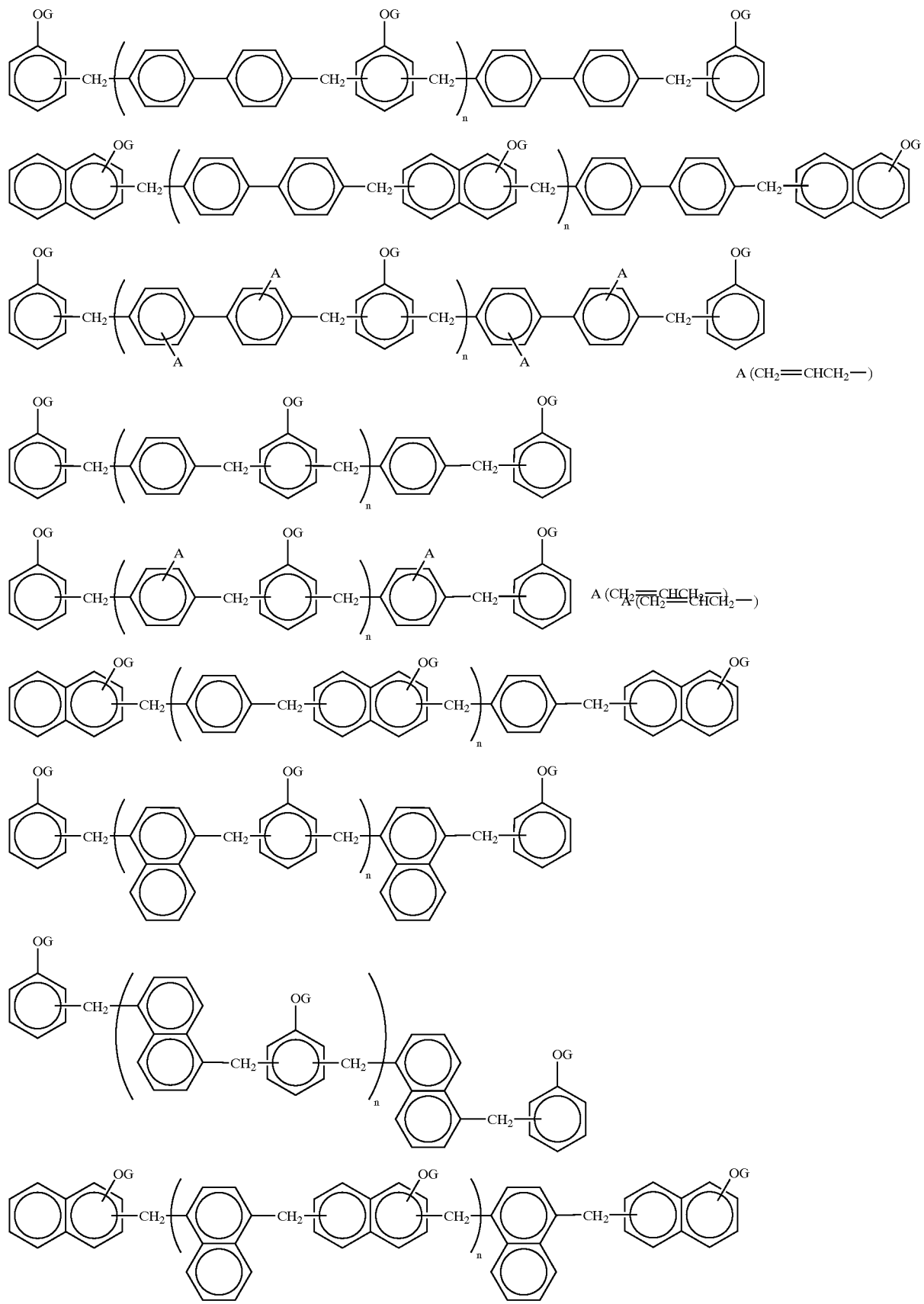

-continued

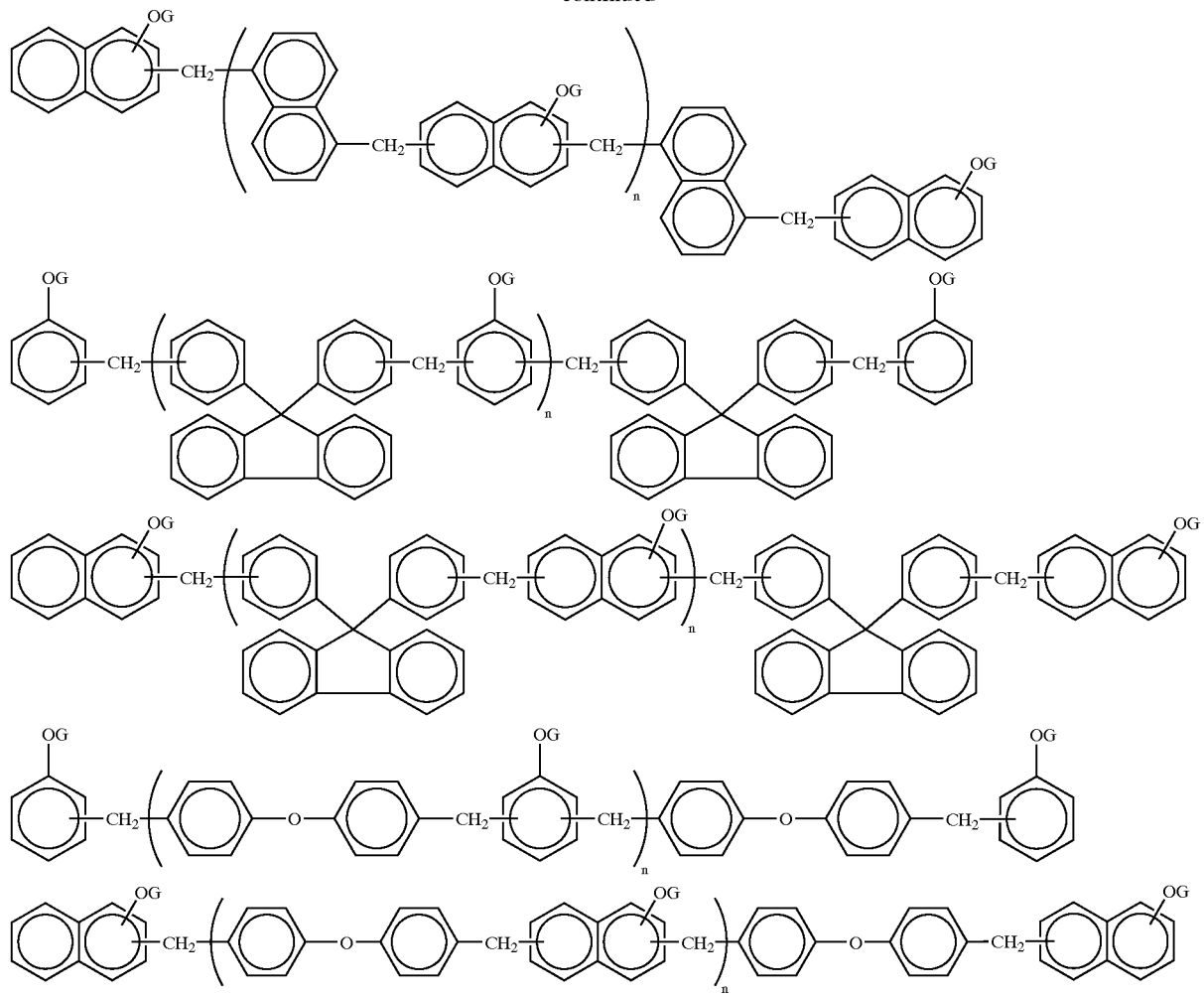

Of these, preferred are phenol biphenyl aralkyl type epoxy resins or phenol phenylene aralkyl type epoxy resins, where the aromatic compound (B) is biphenyl or its derivative, or benzene or its derivative. By using such a novolac type epoxy resin (D), there can be obtained an epoxy resin composition having an adequately low crosslink density and, when the composition is ignited, a rubber-like foamed layer of high thermal decomposition resistance is formed in a more preferred structure. Since biphenyl or its derivative, or benzene or its derivative is very effective in imparting flame retardancy and moreover superior in hydrophobicity, the resin composition containing such a compound is improved also in moisture resistance.

In the flame-retardant epoxy resin composition of the present invention, an epoxy resin other than the epoxy resin (D) can be used in combination with the epoxy resin (D). In that case, the content of the epoxy resin (D) relative to the total amount of the epoxy resins is preferably 5% by mass or more, more preferably 30% by mass or more. Too low a content may result in insufficient flame retardancy.

The epoxy resin usable in combination with the epoxy resin (D) is not particularly restricted. There can be mentioned, for example, phenol biphenyl triazine type epoxy resins, phenol phenylene triazine type epoxy resins, phenol triazine type epoxy resins, at least either of biphenyl-4,4'-diglycidyl ether and 3,3',5,5'-tetramethylbiphenyl-4,4'-diglycidyl ether or a mixture thereof, tetraphenylolethane type epoxy resins, trisphenylolethane type epoxy resins, phenolic novolac epoxy resins, cresol novolac epoxy resins, bisphenol A type epoxy resins, bisphenol F type epoxy resins, bisphenol S type epoxy resins, polyphenol type epoxy resins, aliphatic epoxy resins, aromatic ester type epoxy resins, alicyclic ester type epoxy resins and ether ester type epoxy resins. There can also be used glycidylamine compounds such as diaminodiphenylmethane, diethylenetriamine, diaminodiphenylsulfone and the like. These epoxy resins may be used singly or in admixture of few to several kinds. Of these, particularly preferred are phenol biphenyl triazine type epoxy resins, phenol phenylene triazine type epoxy resins and phenol triazine type epoxy resins for their ability for flame retardancy improvement.

The phenolic resin (C) and the epoxy resin (D) both contained in the flame-retardant epoxy resin composition of the present invention have no particular restriction as to their weight-average molecular weights. The molecular weights are, for example, 300 to 10,000. These weight-average molecular weights can be measured by GPC (gel permeation chromatography).

With respect to the curing agent and the epoxy resin both constituting the flame-retardant epoxy resin composition of the present invention, the ratio (OH/Ep) of the total hydroxyl groups (OH) of the curing agent to the total epoxy groups (Ep) of the epoxy resin is appropriately $0.7 \leq (OH/Ep) \leq 2.5$, because the cured material obtained by curing them shows improved flame retardancy. When the (OH/Ep) is less than 0.7, epoxy group remains in the crosslinked structure in the above-mentioned cured material, formed by the reaction of the curing agent and the epoxy resin and this remaining epoxy group results in generation of an increased amount of combustible components such as allyl alcohol, which may impair the improvement of flame retardancy. When the (OH/Ep) is more than 2.5, the crosslink density of the cured material, obtained by the reaction of the epoxy resin and the curing agent is too low, which may result in insufficient curing and may incur the insufficient heat resistance or strength of the cured material.

The metal hydroxide contained in the flame-retardant epoxy resin composition of the present invention is preferably a metal hydroxide containing at least one element selected from aluminum, magnesium, zinc, boron, calcium, nickel, cobalt, tin, molybdenum, copper, iron and titanium. As specific examples of the metal hydroxide, there are mentioned metal hydroxides each containing, as the main component, aluminum hydroxide, magnesium hydroxide, zinc borate, calcium hydroxide, nickel hydroxide, cobalt hydroxide, tin hydroxide, zinc molybdate, copper hydroxide, iron hydroxide or the like. These metal hydroxides can be used singly, or in the form of a mixture or solid solution of few to several kinds, or by coating, on one kind of metal hydroxide, other kind of metal hydroxide. Of these, aluminum hydroxide, magnesium hydroxide and zinc borate are preferred for their ability for flame retardancy improvement. Aluminum hydroxide is particularly preferred because it is highly resistant to acids and alkalis and allows the resulting cured material to have excellent processability.

The content of the metal hydroxide relative to the total weight of the flame-retardant epoxy resin composition of the present invention is preferably 70% by mass or less. Here, the total weight of the flame-retardant epoxy resin composition refers to the weights of the epoxy resin, the curing agent, and various additives such as curing accelerator, silicone compound, filler and the like and, when the composition is used in a laminate or the like, refers to the weights of the total components excluding the substrate such as glass fiber or the like. When the content of the metal hydroxide is set as above, the resulting epoxy resin composition can have a high degree of flame retardancy while keeping the moldability and dielectric properties at satisfactory levels. Therefore, when the composition is used particularly in a laminate, a high-quality laminate having a high degree of flame retardancy can be obtained. When the metal hydroxide content is set at 60% by mass or less, the resulting epoxy resin composition is improved strikingly in soldering heat resistance and moisture resistance. Therefore, when the composition is used, for example, in a laminate, a high-quality laminate having excellent soldering heat resistance can be obtained. When the metal hydroxide content is set at 55% by mass or less, there is further improvement in moldability, dielectric properties and moisture resistance. Meanwhile, the lower limit of the metal hydroxide content is preferably 10% by mass or more, more preferably 30% by mass or more. With such a metal hydroxide content, sufficient flame retardancy can be achieved. Incidentally, when a silica powder such as fused silica and crystalline silica is used in combination with the metal hydroxide, the content of the metal hydroxide can be lowered and yet sufficient flame retardancy can be obtained. When the metal hydroxide is used in combination with a silicone compound, the metal hydroxide content can be smaller than the above-mentioned level and yet sufficient flame retardancy can be obtained; in this case, the metal hydroxide content is set preferably at 5% by mass or more, more preferably at 20% by mass or more.

The flame-retardant epoxy resin composition of the present invention may further contain a silicone compound of branched main chain structure having aromatic compound-derived group. Thereby, the composition can have even higher flame retardancy; further, in the composition, since the metal hydroxide content can be further reduced, the reduction in moldability and electric properties (dielectric properties), caused by the metal hydroxide can be prevented more effectively.

In the present invention, the aromatic compound-derived group contained in the silicone compound is a functional group derived from an aromatic compound; and the aromatic compound refers to a compound having an aromatic ring(s) such as benzene ring, condensed benzene ring, polycyclic ring, non-benzene type aromatic ring, heterocyclic aromatic ring and/or the like. The aromatic compound can be exemplified by benzene, naphthalene, anthracene, biphenyl, diphenyl ether, biphenylene, pyrrole, benzoguanamine, melamine, acetoguanamine, and derivatives thereof. The derivatives can be exemplified by $C_{1-10}$ alkyl group addition products of the above-mentioned compounds. As a preferred example of the aromatic compound-derived group, phenyl group can be mentioned, because it is superior in ability for flame retardancy improvement.

The silicone compound of the present invention is preferably a silicone compound having a branched structure main chain and containing, in the structure, units (T units) represented by a formula $RSiO_{1.5}$. The silicone compound may further contain units (Q units) represented by a formula $SiO_2$. Particularly preferably for flame retardancy improvement, the branched structure main chain of the silicone compound is constituted by units (T units) represented by a formula $RSiO_{1.5}$, units (D units) represented by a formula $R_2SiO_{1.0}$ and units (M units) represented by a formula $R'_3SiO_{0.5}$. A silicone compound having such a structure can give an epoxy resin composition improved in thermal decomposition resistance more effectively and having higher flame retardancy. As such a silicone compound, there can be mentioned, for example, those having the structure of the following formula.

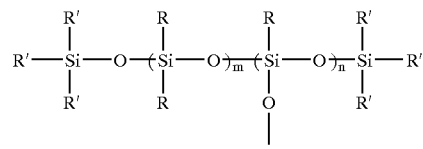

The above formula is intended to show an example of the structure of the silicone compound of the present invention, and individual Rs and individual R's may respectively be the same or different.

The silicone compound of the present invention preferably has reactive group capable of reacting with the epoxy resin and/or the curing agent. For example, in the above formula, R and R' preferably contain reactive group capable of reacting with the epoxy resin and the curing agent, for example, at least one group selected from hydroxyl group, $C_{1-5}$ alkoxy group, epoxy group and carboxyl gorup. These reactive groups may be contained as one kind or two or more kinds. As functional group other than aromatic compound-derived group, there are preferred $C_{1-10}$ alkyl groups, particularly methyl group.

In the silicone compound of the present invention, the proportion of the reactive group in the total amount of the functional groups (R and R') is preferably 0.05 mole % to less than 20 mole %, more preferably 0.1 mole % to less than 10 mole %. When the proportion is in such a range, formation of agglomerate by the reaction between silicone molecules can be prevented and effective improvement of thermal decomposition resistance is obtainable.

The silicone compound having a branched structure main chain and containing aromatic compound-derived group in the structure, used in the flame-retardant epoxy resin composition of the present invention has no particular restriction as to the weight-average molecular weight. However, the weight-average molecular weight is preferably 200 to 500,000, particularly preferably 1,000 to 100,000. When the weight-average molecular weight is too small, the silicone compound itself may have low flame retardancy. Meanwhile, when the weight-average molecular weight is too large, the dispersibility of the silicone compound in the epoxy resin composition is insufficient, which may result in low moldability of the resulting composition. Incidentally, the weight-average molecular weight can be measured by GPC (gel permeation chromatography).

The molar ratio (T/D) of the T units (the units represented by the formula $RSiO_{1.5}$) and the D units (the units represented by the formula $R_2SiO_{1.0}$) both constituting the silicone compound used in the present invention is preferably $(0.1/1) \leq (T/D) \leq (9/1)$. When the (T/D) is less than (0.1/1), the silicone compound itself has low thermal resistance and consequently the epoxy resin composition containing the silicone compound may have low flame retardancy. When the (T/D) is more than (9/1), the epoxy resin composition containing such a silicone compound may have low moldability.

In the silicone compound of the present invention, the proportion of the phenyl group in the total amount of the functional groups (R and R') is preferably 20 mole % or more, particularly preferably 40 mole % or more. When the proportion is less than 20 mole %, the silicone compound has low compatibility with the phenolic resin and epoxy resin constituting the epoxy resin composition of the present invention, which may result in low moldability and flame retardancy of the resulting epoxy resin composition.

In the flame-retardant epoxy resin composition of the present invention, the content of the silicone compound having a branched structure main chain and containing, in the structure, aromatic compound-derived group is preferably 0.1 to 20% by mass relative to the total amount of the phenolic resin, epoxy resin, metal hydroxide and additives all constituting the flame-retardant epoxy resin composition, in order to achieve both flame retardancy and moldability at sufficient levels. When the content of the silicone compound is less than 0.1% by mass, the resulting epoxy resin composition may have insufficient flame retardancy. When the content is more than 20% by mass, the resulting epoxy resin composition may have low moldability.

The silicone compound of the present invention may be used by reacting it, in advance, with the phenolic resin or epoxy resin of the present invention or with other curing agent or epoxy resin.

In the flame-retardant epoxy resin composition of the present invention, it is possible to further use, as necessary, a metal oxide in combination with the metal hydroxide. Specific examples of the metal oxide usable in combination are silicon oxide and calcium oxide, but the metal oxide is not particularly restricted. These metal oxides may be used by mixing a metal oxide or a mixture or solid solution of few to several kinds of metal oxides with the metal hydroxide or by coating it, being the metal oxide or the mixture or solid solution, on the metal hydroxide, or by making it into a solid solution with the metal hydroxide. Of various combinations of the metal oxide and the metal hydroxide, a combination of aluminum hydroxide or magnesium hydroxide with silicon oxide is preferred in view of the flame retardancy improvement obtained. In the epoxy resin composition of the present invention, the metal hydroxide may be used by being surface-treated with an organic substance such as phenolic resin, other polymer or the like. Further, the metal hydroxide may be used by being coated with a metal oxide or being made into a solid solution with a metal oxide and then being surface-treated with an organic substance such as phenolic resin, other polymer or the like.

The flame-retardant epoxy resin composition of the present invention may further contain, as necessary, various additives such as curing accelerator, release agent, surface-treating agent, filler other than metal hydroxide, and the like.

As the curing accelerator of the above additives, those ordinarily used in curing of an epoxy resin and a curing agent can be used. There can be mentioned, for example, diazabicycloalkenes and their derivatives such as 1,8-diazabicyclo(5,4,0)undecene-7 and the like; tertiary amines such as triethylenediamine, benzyldimethylamine, triethanolamine, dimethylaminoethanol, tris (dimethylaminomethyl)phenol and the like; imidazoles such as 2-methylimidazole, 2-phenylimidazole, 2-phenyl-4-methylimidazole, 2-heptadecylimidazole and the like; organic phosphines such as tributylphosphine, methyldiphenylphosphine, triphenylphosphine and the like; tetra(substituted phosphonium) tetra(substituted borate)s such as tetraphenylphosphonium tetraborate and the like; and tetraphenylborates such as 2-ethyl-4-methylimidazole tetraphenylborate, N-methylmorpholine tetraphenylborate and the like. These curing accelerators can be used singly or in admixture of two or more kinds.

The flame-retardant epoxy resin composition of the present invention may contain as necessary, as other additives, a coloring agent such as carbon black, a stress-reducing component such as silicone oil or silicone rubber, a plasticizer such as silicone powder, a release agent such as natural wax, synthetic wax, higher fatty acid, metal salt of higher fatty acid, ester type wax, polyolefin type wax or paraffin and a coupling agent such as organic silane compound, organic titanate compound or organoaluminum compound. Of the above-mentioned coupling agents, in particular, an organic silane compound, i.e. an alkoxysilane having reactive functional group is important for improvement of the strength, chemical resistance and electrical properties of the flame-retardant epoxy resin composition of the present invention. As specific examples of the alkoxysilane, there can be mentioned aminosilane compounds such as γ-aminopropyltriethoxysilane, N-phenyl-γ-aminopropyltrimethoxysilane and the like; epoxysilane compounds such as γ-glycidoxypropyltrimethoxysilane, γ-glycidoxypropylmethyldiethoxysilane and the like; vinylsilane compounds such as vinyltris(β-methoxyethoxy)silane and the like; acrylic silane compounds such as γ-methacryloxypropyltrimethoxysilane and the like; and mercaptosilane compounds such as γ-mercaptopropyltrimethoxysilane and the like. Of these coupling agents, aminosilane compounds and epoxysilane compounds are preferred because they can improve the adhesivity between the resin component and the metal hydroxide both constituting the epoxy resin composition of the present invention; and aminosilane compounds are particularly preferred.

The flame-retardant epoxy resin composition of the present invention can use a known filler, besides the metal hydroxide. As such a known filler, there can be mentioned, for example, carbon fiber; powders of fused silica, crystalline silica, alumina, zircon, calcium silicate, calcium carbonate, silicon carbide, boron nitride, beryllia, talc, titanium oxide, zirconia and the like; beads made therefrom; and single crystal fibers of potassium titanate, silicon carbide, silicon nitride, alumina and the like. These fillers may be used singly or in admixture of two or more kinds. A powder of fused silica and a powder of crystalline silica are particularly preferred.

The flame-retardant epoxy resin composition of the present invention is very effective when used as a composite material obtained by impregnating the composition into a substrate such as glass fiber, paper, aramid fiber or the like and curing the impregnated composition. Particularly when the present flame-retardant epoxy resin composition is impregnated into a glass fiber substrate or a paper substrate and curing the impregnated composition to produce a prepreg or a laminate, the prepreg or the laminate can have a high degree of flame retardancy while maintaining the properties such as moldability, dielectric properties and moisture resistance (soldering heat resistance) of the composition at sufficient levels.

The laminate according to the present invention is preferred to be produced so as to satisfy the following conditions (a) to (d).

(a) $45 \leq \sigma \leq 100$, preferably $50 \leq \sigma \leq 100$ and $3 \leq E \leq 12$, preferably $3 \leq E \leq 10$.

$\sigma$ is a bending strength (MPa) of the laminate at $230 \pm 10°$ C. and E is a flexural modulus (GPa) of the laminate at $230 \pm 10°$ C.

By allowing the bending strength and the flexural modulus to fall in the above ranges, a foamed resin layer can be formed on a preferred structure, the foamed layer can have a sufficient strength and sufficient toughness, thereby the foamed layer can have sufficient preventability for ignition. When the flexural modulus is too small, it is difficult to obtain a foamed layer of sufficient strength. Meanwhile, when the flexural modulus is too large, it is difficult to allow the foamed layer to have sufficient toughness.

(b) $30 \leq G \leq 60$.

G is a proportion (mass %) of the substrate in a total amount of the laminate.

When the amount of the substrate is too small, the resin flow during molding is striking and molding may be difficult. Meanwhile, when the amount of the substrate is too large, no sufficient adhesion is obtained and interlaminar delamination may occur.

(c) $F \leq 45$ (mass %), preferably $F \leq 45$ (mass %) and F (mass %)=$R \times 100/X$.

R is a amount of a thermal decomposition product other than water, generating from a room temperature (25° C.) to 500° C., and is calculated form the following formula;

$$R = [\text{total amount } (W_1) \text{ of laminate}] - [\text{residual amount } (W_2) \text{ of laminate at } 500° \text{C.}] - [\text{amount of } H_2O \text{ generated at } 500° \text{C.} (W_{H2O/500°C.})].$$

X is a content of the resin component in the laminate (a total amount of the epoxy resin and the curing agent and, when a coupling agent and a catalyst are contained in the flame-retardant epoxy resin composition, amounts thereof are also included), and is calculated from the following formula;

$$X = [\text{total amount } (W_1) \text{ of laminate}] - [\text{residual amount } (W_3) \text{ of laminate at } 800° \text{C.}] - [\text{amount of } H_2O \text{ generated at } 800° \text{C.} (W_{H2O/800°C.})].$$

Incidentally, in FIG. 1 is shown a schematic drawing for explaining the method for determining the value of the above F.

The amount of thermal decomposition product other than water indicates the amount of combustible components generating during resin ignition. By allowing F to fall in the above range, higher flame retardancy can be obtained.

(d) $4 \leq V \leq 13$.

V is a amount (V mass %) of a water vapor generating from a room temperature (25° C.) to 500° C., relative to a total amount of the laminate, when the laminate is subjected to thermal decomposition at a temperature elevation rate of 10° C./min at an air flow rate of 0.2 liter/min.

When the value of V is too small, no water vapor sufficient for filling the foamed layer is generated and no sufficient flame retardancy is obtained. Meanwhile, when the value of V is too large, flame retardancy may be impaired. The reason therefor is not clear but it is presumed to be due to, for example, the breakage of foamed layer.

To the flame-retardant epoxy resin composition of the present invention may further be added, as necessary, a nitrogen-based flame retardant such as melamine, isocyanuric acid compound or the like, or a phosphorus-based flame retardant such as red phosphorus, phosphoric acid compound, organic phosphorus compound or the like, all as an auxiliary flame retardant. In the flame-retardant epoxy resin composition of the present invention, the use amount of such a flame retardant can be small and therefore the reduction in properties such as moisture resistance and the like can be prevented.

A prepreg can be produced from the flame-retardant epoxy resin composition of the present invention by an ordinary method of diluting the composition with an appropriate organic solvent such as methyl ethyl ketone and propylene glycol monomethyl ether to form a varnish, impregnating, by coating, the varnish into a porous glass substrate such as a woven and nonwoven glass fabric and heating the resulting material. A copper clad glass-epoxy laminate can be produced from the prepreg by laminating a plurality of such prepregs, placing a copper foil on one or both sides of the resulting laminate, and then hot-pressing the copper-clad laminate under ordinary conditions. When no copper foil is used in the above production, a laminate is obtained. A multi-layered laminate can be produced from the copper-clad laminate by an ordinary method of forming a circuit in the copper-clad laminate as an inner layer, subjecting the copper foil of the laminate to an etching treatment, placing a prepreg and a copper foil on at least one side of the inner layer, and hot-pressing the resulting material, for example, at a temperature of 170° C. at a pressure of 40 kg/cm$^2$ for 90 minutes. A printed wiring board can be produced from the copper-clad laminate or the multi-layered laminate by an ordinary method of forming throughholes in the laminate, plating the throughholes, and then forming a predetermined circuit. The thus-produced laminate of the present invention has a high degree of flame retardancy and high safety.

When the flame-retardant epoxy resin composition of the present invention is used as an encapsulating agent for semiconductor device, the raw materials for the composition are subjected to preliminary kneading by a ribbon blender, a Henschel mixer or the like; then, the pre-kneaded material is treated by a hot roll, a kneader or the like to form a flame-retardant epoxy resin composition, a mixture of the present invention; as necessary, moisture is removed from the mixture; and the resulting mixture is melted under given molding conditions by a transfer molding machine or the like and used as an encapsulating agent for semiconductor device.

The semiconductor device obtained by using the flame-retardant epoxy resin composition of the present invention as an encapsulating agent is superior in flame retardancy and safety. As such a semiconductor device, there can be mentioned, for example, a semiconductor device obtained by mounting semiconductor components on the die pad of a lead frame, connecting them by wire bonding, and encapsulating the resulting material with a resin; a resin-encapsulated semiconductor device of lead-on-chip type; and a resin-encapsulated semiconductor device of ball grid array (BGA) type. Other semiconductor devices can also be mentioned, and all the semiconductor devices obtained by encapsulating the electronic parts such as semiconductor components with the epoxy resin composition of the present invention are included.

The flame-retardant epoxy resin composition of the present invention is superior in fame retardancy and safety also when used in other applications such as molding material, casting material, adhesive, coating and the like.

EXAMPLES AND COMPARATIVE EXAMPLES

The present invention is described in more detail below by way of Examples.

First, explanation is made on the raw materials used in Examples and Comparative Examples.

(Glass Fabric)

An E glass cloth of 0.18 mm in thickness was used.

(Silane Coupling Agents)

Silane coupling agent A: KBE 903 (γ-aminopropyltriethoxysilane, a product of Shin-Etsu Chemical Co., Ltd.) was used.

Silane coupling agent B: KBM 403 (a product of Shin-Etsu Chemical Co., Ltd.)

(Curing Accelerator Catalysts)

Curing accelerator catalyst A: U-CAT-SA 102 (diazabicycloundecene-octylic acid salt, a product of SAN-APRO LIMITED) was used.

Curing accelerator catalyst B: 2E4MZ (a product of Shikoku Chemicals Corporation)

(Phenolic Resins and Epoxy Resins)

The phenolic resins and epoxy resins represented by the following formulas (1) to (8) were used.

Phenol biphenyl aralkyl resin (phenolic resin 1)

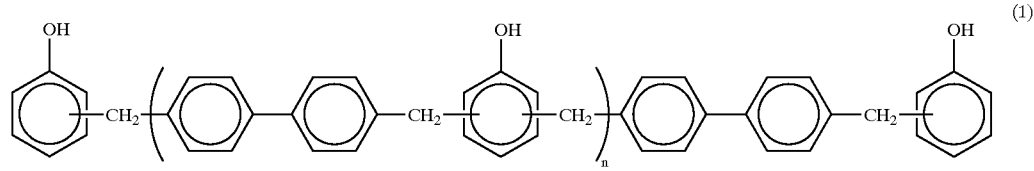

(1)

(wherein n=0.0 to 10, softening point: 120° C., hydroxyl group: 205 g/eq).

Phenol biphenyl aralkyl epoxy resin (epoxy resin 1)

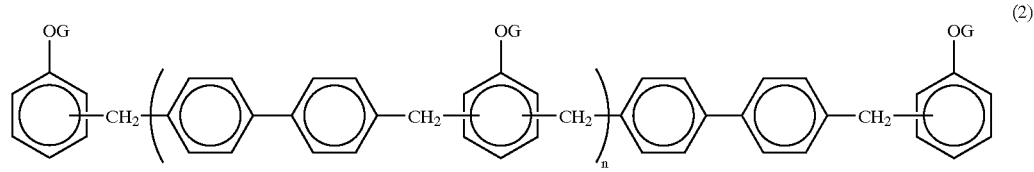

(2)

(wherein each G is a glycidyl group, n=0.0 to 10, softening point: 57° C., epoxy equivalent: 270 g/eq).

Phenol phenylene aralkyl resin (phenolic resin 2)

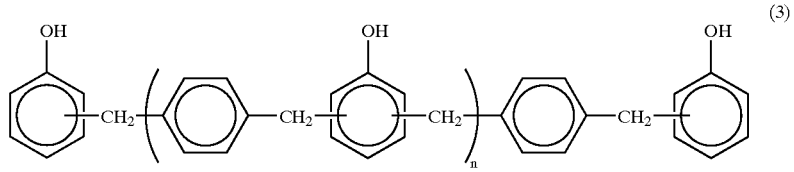

(3)

(wherein n=0.0 to 10, softening point: 83° C., hydroxyl equivalent: 175 g/eq). Phenol phenylene aralkyl epoxy resin (epoxy resin 2)

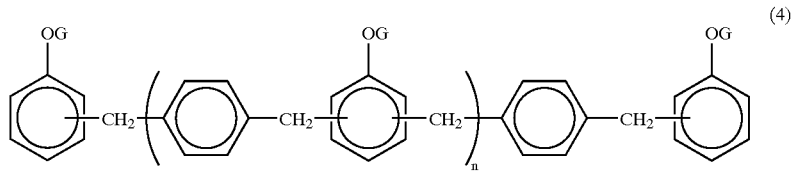

(wherein each G is a glycidyl group, n=0.0 to 10, softening point: 55° C., epoxy equivalent: 234 g/eq).

Phenolic novolac resin (phenolic resin 3)

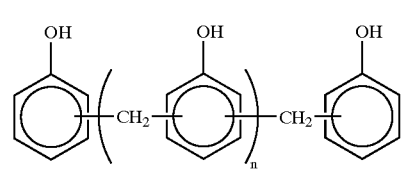

(wherein n=0.0 to 10, softening point: 106° C., hydroxyl equivalent: 106 g/eq).

Cresol novolac epoxy resin (epoxy resin 3)

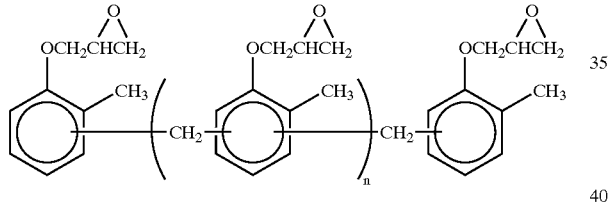

(wherein G is a glycidyl group, n=0.0 to 10, softening point: 68° C., epoxy equivalent: 194 g/eq).

Bisphenol A type epoxy resin (epoxy resin 4)

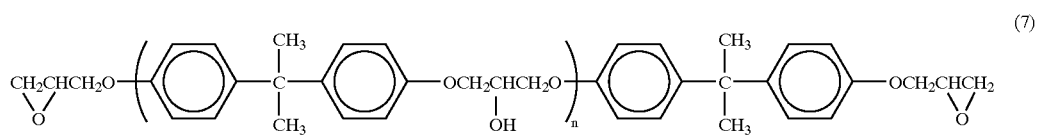

(wherein G is a glycidyl group, n=0.0 to 10, viscosity at 25° C.: 150 poise, epoxy equivalent: 180 g/eq).

Epoxy resin S (bisphenol A type epoxy resin 2): Epikote 1001 (a product of Yuka Shell Epoxy K.K., epoxy equivalent: 473)

Epoxy resin 6 (phenolic novolac epoxy resin): EPPN-201 (a product of Nippon Kayaku Co., Ltd., epoxy equivalent: 191)

(Dicyandiamide)

AMICURE CG-NA (a product of Air Products Japan, active hydrogen equivalent: 21)

(Silicone Compounds)
Compounds shown in Table 1 were used.

TABLE 1

| Kinds of functional groups (R and R') | Silicone 1 | Silicone 2 | Silicone 3 | Silicone 4 | Silicone 5 |
|---|---|---|---|---|---|
| Reactive functional group (1) | Hydroxyl group (1 mole %) | Carboxyl group (3 mole %) | Methoxy group (5 mole %) | Carboxyl group (3 mole %) | None (0 mole %) |
| Content of phenyl group (2) | 80 mole % | 50 mole % | 30 mole % | 0 mole % | 0 mole % |
| Functional group other than (1) and (2) | Methyl | Methyl | Methyl | Methyl | Methyl |
| Weight-average molecular weight | 5000 | 10000 | 40000 | 10000 | 10000 |
| T/D molar ratio | 4/1 | 1/1 | 0.5/1 | 1/1 | D units alone |

(Metal Hydroxides)

Aluminum hydroxide: BW 103 (a product of Nippon Light Metal Co., Ltd.)

Magnesium hydroxide: FR-98-010 (a product of Bromochem Far East K.K.)

Zinc borate: Firebrake@290 (a product of US Borax Inc.)

Aluminum hydroxide B: CL-310 (a product of Sumitomo Chemical Co., Ltd.)

(Inorganic Filler)

Fused crushed silica: FS-892 (a product of Denki Kagaku Kogyo K.K., average particle diameter: 18 μm)

Next, there are shown the methods for measurements of flame retardancy, dielectric constant, moldability and soldering heat resistance, used in Examples and Comparative Examples.

(Flame Retardancy)

A molded plate [13 cm (length)×13 mm (width)×1.6 mm (thickness)] is fixed by a sample holder (a clamp) so that the lengthwise direction of the molded plate and the earth surface become perpendicular to each other. Then, the flame of a burner is applied to one end of the molded plate distant from the clamp, for 10 seconds. Thereafter, the burner is kept away and there is measured a time in which a flame remains on the molded plate (a flame-remaining time, seconds) (this is taken as F1, i.e. first flame-remaining time). After this flame has gone out, the flame of the burner is applied again for 10 seconds; the burner is kept away; and there is measured, in the same manner as in the first measurement, a flame-remaining time (F2, i.e. second flame-remaining time). This test was conducted using five same molded plates for one resin cured material, to examine the flame retardancy. Incidentally, the evaluation standard for flame retardancy is UL 94 V-0, V-1, V-2 and NOT V-2, wherein the V-0 is the highest flame retardancy and the NOT V-2 is the lowest flame retardancy.

(1) UL 94 V-0

ΣF≦50 seconds (ΣF is the total of the flame-remaining times obtained in the test conducted for five same molded plates. That is, F1 and F2 are measured for one molded plate and their total time is taken as the total flame-remaining time F for the molded plate. This F is measured for each of five same molded plates and their total was taken as ΣF. Incidentally, the "flame-remaining time" in the following tables indicates the above ΣF.)

Fmax≦10 seconds (Fmax indicates the longest flame-remaining time of the F1s and F2s obtained in the test.)

There is no ignition of marking cotton caused by smoking substance or melt-dropped substance, and there is no ignition of clamp.

(2) UL 94 V-1

ΣF≦250 seconds, Fmax≦30 seconds. There is no ignition of marking cotton caused by smoking substance or melt-dropped substance, and there is no ignition of clamp.

(3) UL 94 V-2

ΣF≦250 seconds, Fmax≦30 seconds, There is ignition of marking cotton caused by smoking substance or melt-dropped substance, but there is no ignition of clamp.

(4) UL 94 NOT V-2

ΣF>250 seconds or Fmax>30 seconds.

(Dielectric Constant)

A molded plate [2 cm×2 cm×1.6 mm (thickness)] was measured for relative dielectric constant using 4291BRF IMPEDANCE/MATERIAL ANALYZER, a product of Hewlett Packard Co. Incidentally, the frequency used in the measurement was 1 GHz.

The following standard was used for evaluation of relative dielectric constant;

Relative dielectric constant is 5.0 or less: ○,

Relative dielectric constant is over 5.0: Δ.

(Moldability)

Moldability is good: ○

Moldability is low due to poor fluidity of impregnated resin: Δ

Moldability is low due to oozing-out of silicone resin: ▲

(Soldering Heat Resistance)

A copper-clad (both sides) laminate [25 mm×25 mm×1.6 mm (thickness)] was placed in boiling water (about 100° C.) for 1 hour, followed by cooling with running water for 30 minutes. The water on the surface of the laminate was wiped off sufficiently, after which the laminate was allowed to float on a solder bath of about 260° C. for 20 seconds to evaluate the soldering heat resistance of the laminate. The following standard was used for evaluation of the soldering heat resistance;

No blistering: ○,

Blistering: Δ.

Example 1

Methyl ethyl ketone was added to a mixture consisting of 33.48% by mass of a phenol biphenyl aralkyl epoxy resin (epoxy resin 1), 25.43% by mass of a phenol biphenyl aralkyl resin (phenolic resin 1), 40.0% by weight of aluminum hydroxide, 0.80% by mass of a silane coupling agent and 0.29% by mass of a curing accelerator catalyst, to prepare an epoxy resin varnish containing 65% by mass of non-volatile components.

The epoxy resin varnish was continuously impregnated into a glass fabric by coating, followed by drying in an oven of 120° C., to produce a prepreg. Eight such prepregs were laminated to prepare a laminate. The laminate was hot-pressed at 170° C. at a pressure of 40 kg/cm$^2$ for 20 minutes and then post-cured at 175° C. for 6 hours to obtain a glass-epoxy laminate having a thickness of 1.6 mm.

The laminate was examined for flame retardancy, dielectric constant and moldability. The results are shown in Table 2.

The epoxy resin varnish obtained in Example 1 was continuously impregnated into a glass fabric by coating, followed by drying in an oven of 120° C., to produce a prepreg. Eight such prepregs were laminated to prepare a laminate. The laminate was interposed between copper foils (18 μm in thickness) and hot-pressed at 170° C. at a pressure of 40 kg/cm$^2$ for 20 minutes and then post-cured at 175° C. for 6 hours to obtain a copper-clad glass-epoxy laminate having a thickness of 1.6 mm.

The copper clad laminate was examined for soldering heat resistance.

Examples 2 to 24

Laminates were produced in the same manner as in Example 1 except that there were used flame-retardant epoxy resin compositions having the formulations shown in Tables 2 to 5. They were examined for flame retardancy, dielectric constant, moldability and soldering heat resistance. The results are shown in Tables 2 to 5.

Comparative Examples 1 to 14

Laminates were produced in the same manner as in Example 1 except that there were used flame-retardant epoxy resin compositions having the formulations shown in Tables 6 to 8. They were examined for flame retardancy, dielectric constant, moldability and soldering heat resistance. The results are shown in Tables 6 to 8.

Example 25

There were premixed, at ordinary temperature, 15.59% by mass of a phenol biphenyl aralkyl resin (phenolic resin 1), 12.57% by mass of a bisphenol A type epoxy resin (epoxy resin 4), 15.0% by mass of aluminum hydroxide, 55.0% by mass of a fused crushed silica powder, 1.40% by mass of a silane coupling agent, 0.20% by mass of carnauba wax and 0.24% by mass of triphenylphosphine (T.P.P.). The premix was kneaded on a roll of 100° C. for about 5 minutes. The kneaded material was cooled and ground to obtain a resin composition.

The resin composition shown in Example 25 was compressed into tablets. The tablets were preheated to 85° C. and molded in accordance with the UL 94 flame retardancy specification, using a transfer molding machine of single plunger type under the conditions of injection time: 15 seconds, injection pressure: 100 kg/cm$^2$ (working pressure), molding temperature: 175° C. and molding time: 120 seconds. The molded material was post-cured at 175° C. for 6 hours to obtain a molded plate for flame retardancy test.

A semiconductor device for use in measurement of moisture resistance was produced as follows.

On a 42 alloy frame for 16 pin DIP was mounted a silicon-made chip of 3.0 mm (length)×3.5 mm (width)×350 μm (thickness) to which an aluminum wiring of 10 μm in both line width and line intervals (70 μm×70 μm in the pad portion) had been applied. Then, to the pad portion was bonded a gold wiring of 28 μm in diameter. The resulting material was encapsulated with the tablets of Example 25 using a transfer molding machine of single plunger type, under the conditions of preheating temperature: 85° C., injection time: 15 seconds, injection pressure: 100 kg/cm$^2$ (working pressure), molding temperature: 175° C. and molding time: 120 seconds, to produce a semiconductor device of 16 pin DIP type of 18 mm (length)×5 mm (width)×3 mm (thickness) The device was post-cured at 175° C. for 4 hours to obtain a semiconductor device for use in measurement of moisture resistance.

Moisture Resistance Test

Ten semiconductor devices of 16 pin DIP type obtained above were subjected to a pressure cooker bias test (PCBT) under the conditions of 125° C., 100 RH %, 20 V (applied voltage), to measure a time when the circuit defective reached 20% (indicating that defective appeared in two of the ten devices). The time was taken as an index of moisture resistance. That is, when the time is longer, the moisture resistance of the device is better.

Moldability was evaluated according to the following yardstick.

(Moldability)

Moldability is good: ○

Moldability is low due to poor fluidity of impregnated resin: Δ

Moldability is low due to oozing-out of silicone resin: ▲

The results of evaluation are shown in Table 9.

Examples 26 to 30

Molded materials were produced in the same manner as in Example 25 except that there were used flame-retardant epoxy resin compositions having the formulations shown in Table 9. The molded materials were examined for flame-retardancy, moisture resistance and moldability. The results are shown in Table 9.

Comparative Examples 15 to 17

Molded materials were produced in the same manner as in Example 25 except that there were used flame-retardant epoxy resin compositions having the formulations shown in Table 10. The molded materials were examined for flame-retardancy, moisture resistance and moldability. The results are shown in Table 10.

TABLE 2

|  | Examples | | | | | | |
| --- | --- | --- | --- | --- | --- | --- | --- |
|  | 1 | 2 | 3 | 4 | 5 | 6 | 7 |
| Epoxy resin 1 (phenol biphenyl aralkyl epoxy resin) | 33.48 | 27.72 | 21.95 | 33.48 | 33.48 | 16.18 | 10.41 |
| Phenolic resin 1 (phenol biphenyl aralkyl resin) | 25.43 | 21.04 | 16.66 | 25.43 | 25.43 | 12.28 | 7.90 |
| Epoxy resin 2 (phenol phenylene aralkyl epoxy resin) | | | | | | | |
| Phenolic resin 2 (phenol phenylene aralkyl resin) | | | | | | | |
| Epoxy resin 3 (cresol novolac epoxy resin) | | | | | | | |
| Epoxy resin 4 (bisphenol A type epoxy resin) | | | | | | | |
| Phenolic resin 3 (phenolic novolac resin) | | | | | | | |
| Aluminum hydroxide [Al(OH)$_3$] | 40.0 | 50.0 | 60.0 | 15.0 | 7.0 | 70.0 | 80.0 |
| Magnesium hydroxide [Mg(OH)$_2$] | | | | | | | |
| Fused crushed silica | | | | 25.0 | 33.0 | | |
| Silicone 1 | | | | | | | |
| Silicone 2 | | | | | | | |
| Silicone 3 | | | | | | | |
| Silicone 4 | | | | | | | |
| Silicone 5 | | | | | | | |
| Silane coupling agent | 0.80 | 1.00 | 1.20 | 0.80 | 0.80 | 1.40 | 1.60 |
| Curing accelerator catalyst | 0.29 | 0.24 | 0.19 | 0.29 | 0.29 | 0.14 | 0.09 |
| Flame retardancy | | | | | | | |
| Rating | V-1 | V-0 | V-0 | V-1 | V-1 | V-0 | V-0 |
| Flame-remaining time (seconds) | 60 | 30 | 15 | 81 | 120 | 11 | 7 |
| Dielectric constant | ○ | ○ | ○ | Not conducted | Not conducted | ○ | Δ |
| Moldability | ○ | ○ | ○ | ○ | ○ | ○ | Δ |
| Soldering heat resistance | ○ | ○ | ○ | ○ | ○ | Δ | Δ |

TABLE 3

|  | Examples | | | | | |
| --- | --- | --- | --- | --- | --- | --- |
|  | 8 | 9 | 10 | 11 | 12 | 13 |
| Epoxy resin 1 (phenol biphenyl aralkyl epoxy resin) | 27.44 | 24.89 | 26.59 | 26.59 | 26.59 | 26.59 |
| Phenolic resin 1 (phenol biphenyl aralkyl resin) | 20.82 | 18.89 | 20.18 | 20.18 | 20.18 | 20.18 |
| Epoxy resin 2 (phenol phenylene aralkyl epoxy resin) | | | | | | |
| Phenolic resin 2 (phenol phenylene aralkyl resin) | | | | | | |
| Epoxy resin 3 (cresol novolac epoxy resin) | | | | | | |
| Epoxy resin 4 (bisphenol A type epoxy resin) | | | | | | |
| Phenolic resin 3 (phenolic novolac resin) | | | | | | |
| Aluminum hydroxide [Al(OH)$_3$] | 50.0 | 50.0 | 50.0 | 50.0 | 50.0 | 50.0 |
| Magnesium hydroxide [Mg(OH)$_2$] | | | | | | |
| Fused crushed silica | | | | | | |
| Silicone 1 | | | | 2.0 | | |
| Silicone 2 | 0.5 | 5.00 | 2.00 | | | |
| Silicone 3 | | | | | 2.00 | |
| Silicone 4 | | | | | | |
| Silicone 5 | | | | | | 2.0 |
| Silane coupling agent | 1.00 | 1.00 | 1.00 | 1.00 | 1.00 | 1.00 |
| Curing accelerator catalyst | 0.24 | 0.22 | 0.23 | 0.23 | 0.23 | 0.23 |
| Flame retardancy | | | | | | |
| Rating | V-0 | V-0 | V-0 | V-0 | V-0 | V-0 |
| Flame-remaining time (seconds) | 23 | 8 | 15 | 20 | 17 | 38 |
| Dielectric constant | Not conducted | Not conducted | Not conducted | Not conducted | Not conducted | Not conducted |
| Moldability | ○ | ○ | ○ | ○ | ○ | ▲ |
| Soldering heat resistance | ○ | ○ | ○ | ○ | ○ | ○ |

TABLE 4

|  | Examples | | | | | |
| --- | --- | --- | --- | --- | --- | --- |
|  | 14 | 15 | 16 | 17 | 18 | 19 |
| Epoxy resin 1 (phenol biphenyl aralkyl epoxy resin) | | | | | | 14.80 |
| Phenolic resin 1 (phenol biphenyl aralkyl resin) | | | 26.98 | 25.88 | | 9.58 |
| Epoxy resin 2 (phenol phenylene aralkyl epoxy resin) | 27.98 | 22.16 | | | | |
| Phenolic resin 2 (phenol phenylene aralkyl resin) | 20.92 | 16.56 | | | 24.03 | |
| Epoxy resin 3 (cresol novolac epoxy resin) | | | | | | |

TABLE 4-continued

|  | Examples | | | | | |
| --- | --- | --- | --- | --- | --- | --- |
|  | 14 | 15 | 16 | 17 | 18 | 19 |
| Epoxy resin 4 (bisphenol A type epoxy resin) |  |  | 21.78 | 20.89 | 24.73 | 14.80 |
| Phenolic resin 3 (phenolic novolac resin) |  |  |  |  |  | 9.58 |
| Aluminum hydroxide [Al(OH)$_3$] | 50.0 | 60.0 | 50.0 | 50.0 | 50.0 | 50.0 |
| Magnesium hydroxide [Mg(OH)$_2$] |  |  |  |  |  |  |
| Fused crushed silica |  |  |  |  |  |  |
| Silicone 1 |  |  |  | 2.00 |  |  |
| Silicone 2 |  |  |  |  |  |  |
| Silicone 3 |  |  |  |  |  |  |
| Silicone 4 |  |  |  |  |  |  |
| Silicone 5 |  |  |  |  |  |  |
| Silane coupling agent | 1.00 | 1.20 | 1.00 | 1.00 | 1.00 | 1.00 |
| Curing accelerator catalyst | 0.10 | 0.08 | 0.24 | 0.23 | 0.24 | 0.24 |
| Flame retardancy |  |  |  |  |  |  |
| Rating | V-0 | V-0 | V-1 | V-1 | V-1 | V-0 |
| Flame-remaining time (seconds) | 35 | 20 | 80 | 52 | 95 | 46 |
| Dielectric constant | ○ | Not conducted | Not conducted | Not conducted | Not conducted | Not conducted |
| Moldability | ○ | ○ | ○ | ○ | ○ | ○ |
| Soldering heat resistance | ○ | ○ | ○ | ○ | ○ | ○ |

TABLE 5

|  | Examples | | | | |
| --- | --- | --- | --- | --- | --- |
|  | 20 | 21 | 22 | 23 | 24 |
| Epoxy resin 1 (phenol biphenyl aralkyl epoxy resin) | 27.72 |  |  | 27.72 | 27.72 |
| Phenolic resin 1 (phenol biphenyl aralkyl resin) | 21.04 |  |  | 21.04 | 21.04 |
| Epoxy resin 2 (phenol phenylene aralkyl epoxy resin) |  | 27.98 | 26.84 |  |  |
| Phenolic resin 2 (phenol phenylene aralkyl resin) |  | 20.92 | 20.07 |  |  |
| Epoxy resin 3 (cresol novolac epoxy resin) |  |  |  |  |  |
| Epoxy resin 4 (bisphenol A type epoxy resin) |  |  |  |  |  |
| Phenolic resin 3 (phenolic novolac resin) |  |  |  |  |  |
| Aluminum hydroxide [Al(OH)$_3$] |  |  |  |  | 40.0 |
| Magnesium hydroxide [Mg(OH)$_2$] | 50.0 | 50.0 | 50.0 |  |  |
| Zinc borate (2ZnO.3B$_2$O$_3$.3.5H$_2$O) |  |  |  | 50.0 | 10.0 |
| Silicone 1 |  |  |  |  |  |
| Silicone 2 |  |  |  | 2.00 |  |
| Silicone 3 |  |  |  |  |  |
| Silicone 4 |  |  |  |  |  |
| Silicone 5 |  |  |  |  |  |
| Silane coupling agent | 1.00 | 1.00 | 1.00 | 1.00 | 1.00 |
| Curing accelerator catalyst | 0.24 | 0.10 | 0.09 | 0.24 | 0.24 |
| Flame retardancy |  |  |  |  |  |
| Rating | V-0 | V-0 | V-0 | V-0 | V-0 |
| Flame-remaining time (seconds) | 42 | 45 | 31 | 46 | 35 |
| Dielectric constant | Not conducted | Not conducted | Not conducted | Not conducted | Not conducted |
| Moldability | ○ | ○ | ○ | ○ | ○ |
| Soldering heat resistance | ○ | ○ | ○ | ○ | ○ |

TABLE 6

|  | Comparative Examples | | | | | |
| --- | --- | --- | --- | --- | --- | --- |
|  | 1 | 2 | 3 | 4 | 5 | 6 |
| Epoxy resin 1 (phenol biphenyl aralkyl epoxy resin) | 56.56 | 55.43 |  |  |  |  |
| Phenolic resin 1 (phenol biphenyl aralkyl resin) | 42.94 | 42.08 |  |  |  |  |
| Epoxy resin 2 (phenol phenylene aralkyl epoxy resin) |  |  | 57.10 | 55.96 |  |  |
| Phenolic resin 2 (phenol phenylene aralkyl resin) |  |  | 42.70 | 41.84 |  |  |
| Epoxy resin 3 (cresol novolac epoxy resin) |  |  |  |  | 31.53 | 30.24 |
| Epoxy resin 4 (bisphenol A type epoxy resin) |  |  |  |  |  |  |
| Phenolic resin 3 (phenolic novolac resin) |  |  |  |  | 17.23 | 16.53 |
| Aluminum hydroxide [Al(OH)$_3$] |  |  |  |  | 50.0 | 50.0 |
| Magnesium hydroxide [Mg(OH)$_2$] |  |  |  |  |  |  |

TABLE 6-continued

|  | Comparative Examples | | | | | |
|---|---|---|---|---|---|---|
|  | 1 | 2 | 3 | 4 | 5 | 6 |
| Zinc borate (2ZnO.3B$_2$O$_3$.3.5H$_2$O) | | | | | | |
| Silicone 1 | | | | | | |
| Silicone 2 | | 2.00 | | | | |
| Silicone 3 | | | | | | |
| Silicone 4 | | | | | | 2.00 |
| Silicone 5 | | | | 2.00 | | |
| Silane coupling agent | | | | | 1.00 | 1.00 |
| Curing accelerator catalyst | 0.50 | 0.49 | 0.20 | 0.20 | 0.24 | 0.23 |
| Flame retardancy | | | | | | |
| Rating | V-1 | V-1 | V-1 | V-1 | NOT V-2 | NOT V-2 |
| Flame-remaining time (seconds) | 210 | 191 | 206 | 212 | >250 | >250 |
| Dielectric constant | ○ | Not conducted | ○ | ○ | Not conducted | Not conducted |
| Moldability | ○ | ○ | ○ | ▲ | ○ | ▲ |
| Soldering heat resistance | ○ | ○ | ○ | Δ | ○ | Δ |

TABLE 7

|  | Comparative Examples | | | |
|---|---|---|---|---|
|  | 7 | 8 | 9 | 10 |
| Epoxy resin 1 (phenol biphenyl aralkyl epoxy resin) | | | | |
| Phenolic resin 1 (phenol biphenyl aralkyl resin) | | | | |
| Epoxy resin 2 (phenol phenylene aralkyl epoxy resin) | | | | |
| Phenolic resin 2 (phenol phenylene aralkyl resin) | | | | |
| Epoxy resin 3 (cresol novolac epoxy resin) | | | | |
| Epoxy resin 4 (bisphenol A type epoxy resin) | 62.63 | 30.69 | 29.44 | 11.53 |
| Phenolic resin 3 (phenolic novolac resin) | 36.87 | 18.07 | 17.33 | 6.78 |
| Aluminum hydroxide [Al(OH)$_3$] | | 50.0 | 50.0 | 80.0 |
| Magnesium hydroxide [Mg(OH)$_2$] | | | | |
| Zinc borate (2ZnO.3B$_2$O$_3$.3.5H$_2$O) | | | | |
| Silicone 1 | | | 2.00 | |
| Silicone 2 | | | | |
| Silicone 3 | | | | |
| Silicone 4 | | | | |
| Silicone 5 | | | | |
| Silane coupling agent | | 1.00 | 1.00 | 1.60 |
| Curing accelerator catalyst | 0.50 | 0.24 | 0.23 | 0.09 |
| Flame retardancy | | | | |
| Rating | NOT V-2 | NOT V-2 | NOT V-2 | V-1 |
| Flame-remaining time (seconds) | >250 | >250 | >250 | 180 |
| Dielectric constant | Not conducted | Not conducted | Not conducted | Not conducted |
| Moldability | ○ | ○ | ○ | Δ |
| Soldering heat resistance | ○ | ○ | ○ | Δ |

TABLE 8

|  | Comparative Examples | | | |
|---|---|---|---|---|
|  | 11 | 12 | 13 | 14 |
| Epoxy resin 1 (phenol biphenyl aralkyl epoxy resin) | | | | |
| Phenolic resin 1 (phenol biphenyl aralkyl resin) | | | | |
| Epoxy resin 2 (phenol phenylene aralkyl epoxy resin) | | | | |
| Phenolic resin 2 (phenol phenylene aralkyl resin) | | | | |
| Epoxy resin 3 (cresol novolac epoxy resin) | | | | |
| Epoxy resin 4 (bisphenol A type epoxy resin) | 30.69 | 29.44 | 30.69 | 30.69 |
| Phenolic resin 3 (phenolic novolac resin) | 18.07 | 17.33 | 18.07 | 18.07 |
| Aluminum hydroxide [Al(OH)$_3$] | | | | 40.0 |
| Magnesium hydroxide [Mg(OH)$_2$] | 50.0 | 50.0 | | |
| Zinc borate (2ZnO.3B$_2$O$_3$.3.5H$_2$O) | | | 50.0 | 10.0 |
| Silicone 1 | | | | |
| Silicone 2 | | 2.00 | | |
| Silicone 3 | | | | |

TABLE 8-continued

|  | Comparative Examples | | | |
|---|---|---|---|---|
|  | 11 | 12 | 13 | 14 |
| Silicone 4 |  |  |  |  |
| Silicone 5 |  |  |  |  |
| Silane coupling agent | 1.00 | 1.00 | 1.00 | 1.00 |
| Curing accelerator catalyst | 0.24 | 0.23 | 0.24 | 0.24 |
| Flame-retardancy |  |  |  |  |
| Rating | NOT V-2 | NOT V-2 | NOT V-2 | NOT V-2 |
| Flame-remaining time (seconds) | >250 | >250 | >250 | >250 |
| Dielectric constant | Not conducted | Not conducted | Not conducted | Not conducted |
| Moldability | ○ | ○ | ○ | ○ |
| Soldering heat resistance | ○ | ○ | ○ | ○ |

TABLE 9

|  | Examples | | | | | |
|---|---|---|---|---|---|---|
|  | 25 | 26 | 27 | 28 | 29 | 30 |
| Epoxy resin 1 (phenol biphenyl aralkyl epoxy resin) |  |  |  |  |  | 8.70 |
| Phenolic resin 1 (phenol biphenyl aralkyl resin) | 15.59 | 15.59 | 14.49 |  |  | 5.38 |
| Epoxy resin 2 (phenol phenylene aralkyl epoxy resin) |  |  |  | 8.66 | 8.05 |  |
| Phenolic resin 2 (phenol phenylene aralkyl resin) |  |  |  | 5.42 | 5.03 |  |
| Epoxy resin 3 (cresol novolac epoxy resin) |  |  |  | 8.66 | 8.05 | 8.70 |
| Epoxy resin 4 (bisphenol A type epoxy resin) | 12.57 | 12.57 | 11.68 |  |  |  |
| Phenolic resin 3 (phenolic novolac resin) |  |  |  | 5.42 | 5.03 | 5.38 |
| Aluminum hydroxide [Al(OH)$_3$] | 15.0 | 30.0 | 15.0 | 15.0 | 15.0 |  |
| Magnesium hydroxide [Mg(OH)$_2$] |  |  |  |  |  | 15.0 |
| Fused crushed silica | 55.0 | 40.0 | 55.0 | 55.0 | 55.0 | 55.0 |
| Silicone 1 |  |  | 2.0 |  |  |  |
| Silicone 2 |  |  |  |  | 2.00 |  |
| Silicone 3 |  |  |  |  |  |  |
| Silicone 4 |  |  |  |  |  |  |
| Silicone 5 |  |  |  |  |  |  |
| Carnauba wax | 0.20 | 0.20 | 0.20 | 0.20 | 0.20 | 0.20 |
| Silane coupling agent | 1.40 | 1.40 | 1.40 | 1.40 | 1.40 | 1.40 |
| Curing accelerator catalyst | 0.24 | 0.24 | 0.23 | 0.24 | 0.23 | 0.24 |
| Flame retardancy |  |  |  |  |  |  |
| Rating | V-0 | V-0 | V-0 | V-0 | V-0 | V-0 |
| Flame-remaining time (seconds) | 35 | 26 | 22 | 43 | 30 | 41 |
| Moldability | ○ | ○ | ○ | ○ | ○ | ○ |
| Moisture resistance (time of appearance of 20% defective) | 380 | 360 | 450 | 360 | 420 | 370 |

TABLE 10

|  | Comparative Examples | | |
|---|---|---|---|
|  | 15 | 16 | 17 |
| Epoxy resin 1 (phenol biphenyl aralkyl epoxy resin) |  |  |  |
| Phenolic resin 1 (phenol biphenyl aralkyl resin) |  |  |  |
| Epoxy resin 2 (phenol phenylene aralkyl epoxy resin) |  |  | 8.66 |
| Phenolic resin 2 (phenol phenylene aralkyl resin) |  |  | 5.42 |
| Epoxy resin 3 (cresol novolac epoxy resin) |  |  | 8.66 |
| Epoxy resin 4 (bisphenol A type epoxy resin) | 17.72 | 16.47 |  |
| Phenolic resin 3 (phenolic novolac resin) | 10.43 | 9.70 | 5.42 |
| Aluminum hydroxide [Al(OH)$_3$] | 15.0 | 15.0 |  |
| Magnesium hydroxide [Mg(OH)$_2$] |  |  |  |
| Fused crushed silica | 55.0 | 55.0 | 70.0 |
| Silicone 1 |  |  |  |
| Silicone 2 |  |  |  |
| Silicone 3 |  |  |  |
| Silicone 4 |  | 2.00 |  |
| Silicone 5 |  |  |  |
| Carnauba wax | 0.20 | 0.20 | 0.20 |
| Silane coupling agent | 1.40 | 1.40 | 1.40 |
| Curing accelerator catalyst | 0.24 | 0.23 | 0.24 |
| Flame retardancy |  |  |  |
| Rating | V-1 | V-1 | V-1 |
| Flame-remaining time (seconds) | 180 | 173 | 102 |
| Moldability | ○ | ○ | ○ |
| Moisture resistance (time of appearance of 20% defective) | 330 | 330 | 370 |

As seen from the results of the above tables, the flame-retardant epoxy resin compositions according to the present invention are superior in flame-retardancy to those of Comparative Examples according to the prior art. It is also seen that effective improvements in properties such as dielectric properties, moldability, soldering heat resistance, moisture resistance and the like are possible by appropriately setting the addition amount of metal hydroxide.

Example 31

41 phr of methyl ethyl ketone was added to 100% by mass of a mixture consisting of 25.41% by mass of a phenol phenylene aralkyl epoxy resin (epoxy resin 2), 19.01% by mass of a phenol phenylene aralkyl resin (phenolic resin 2), 55.0% by weight of aluminum hydroxide B, 0.55% by mass of a silane coupling agent B and 0.03% by mass of a curing accelerator catalyst B, to prepare an epoxy resin varnish containing 71% by mass of non-volatile components.

The epoxy resin varnish was continuously impregnated into a glass fabric by coating, followed by drying in an oven of 120° C., to produce a prepreg. Seven such prepregs were laminated to prepare a laminate. The laminate was hot-pressed under predetermined conditions (temperature elevation rate: 5° C./min, keeping at 180° C. for 1 hour, cooling to 80° C. in 30 minutes, 32 kg/cm$^2$) to obtain a glass-epoxy laminate of 1.6 mm in thickness.

The glass-epoxy laminate was measured for high-temperature bending property and thermal decomposition property under the following conditions.

(1) High-Temperature Bending Test

JIS-C-6481, test speed: 0.8 mm/min, span: 25.6 mm, test piece size: 25 mm×50 mm×1.6 mm, test temperature: 240° C., no notch.

(2) Method for Thermal Decomposition

Temperature elevation was made from room temperature to 500° C. or 800° C. at a temperature elevation rate of 10° C./min at an air flow rate of 0.2 liter/min.

Seven prepregs obtained in Example 31 were laminated. The resulting laminate was interposed between copper foils (18 μm in thickness) and hot-pressed under predetermined conditions (temperature elevation rate: 5° C./min, keeping at 180° C. for 1 hour, cooling to 80° C. in 30 minutes, 32 kg/cm$^2$) to obtain a copper-clad glass-epoxy laminate of 1.6 mm in thickness. The copper-clad laminate was examined for soldering heat resistance.

Similarly, Examples 32 to 43, Comparative Examples 18, 19 and 24 and Reference Examples 25, 26, 29 and 30 were carried out (however, these examples were different in content of non-volatile components and molding pressure). The results are shown in Tables 11 to 14.

Comparative Example 20

There were prepared a solution A obtained by dissolving dicyandiamide in DMF (dimethylformamide), and a solution B obtained by dissolving a bisphenol A type epoxy resin, aluminum hydroxide B and a silane coupling agent B in methyl ethyl ketone. The solution A and the solution B were mixed to prepare a mixed solution C. Thereto was added a curing accelerator catalyst B to produce an epoxy resin varnish containing 68.0% by mass of non-volatile components. The non-volatile components in the varnish is a mixture of 1.89% by mass of dicyandiamide, 42.46% by mass of the bisphenol A type epoxy resin (epoxy resin 5), 55.0% by mass of aluminum hydroxide B, 0.55% by mass of the silane coupling agent B and 0.10% by mass of the curing accelerator catalyst B. The volatile components in the varnish are a mixed solvent consisting of 41 phr (relative to 100% by mass of the above mixture) of methyl ethyl ketone and 6 phr of DMF.

The epoxy resin varnish was continuously impregnated into a glass fabric by coating, followed by drying in an oven of 130° C., to produce a prepreg. Seven such prepregs were laminated. The resulting laminate was hot-pressed under predetermined conditions (temperature elevation rate: 5° C./min, keeping at 180° C. for 1 hour, cooling to 80° C. in 30 minutes, 32 kg/cm$^2$) to obtain a glass-epoxy laminate of 1.6 mm in thickness.

Seven prepregs obtained in Comparative Example 20 were laminated. The resulting laminate was interposed between copper foils (18 μm in thickness) and hot-pressed under predetermined conditions (temperature elevation rate: 5° C./min, keeping at 180° C. for 1 hour, cooling to 80° C. in 30 minutes, 32 kg/cm$^2$) to obtain a copper-clad glass-epoxy laminate of 1.6 mm in thickness.

The copper-clad laminate was examined for soldering heat resistance.

Similarly, Comparative Examples 21, 22 and 23 and Reference Examples 27 and 28 were carried out (however, these examples were different in content of non-volatile components and molding pressure). The results are shown in Tables 13 to 14.

As seen from the results of the above tables, the flame-retardant epoxy resin compositions according to the present invention are superior in flame-retardancy to those of Comparative Examples according to the prior art. It is also seen that effective improvements in properties such as dielectric properties, moldability, soldering heat resistance, moisture resistance and the like are possible by appropriately setting the addition amount of metal hydroxide.

TABLE 11

|  | Examples | | | | | | |
| --- | --- | --- | --- | --- | --- | --- | --- |
|  | 31 | 32 | 33 | 34 | 35 | 36 | 37 |
| Resin composition | | | | | | | |
| Epoxy resin 1 (phenol biphenyl aralkyl epoxy resin) (mass %) | — | — | — | — | — | — | — |
| Phenolic resin 1 (phenol biphenyl aralkyl resin (mass %) | — | — | — | — | — | — | — |
| Epoxy resin 2 (phenol phenylene aralkyl epoxy resin) (mass %) | 25.41 | 13.62 | 8.32 | — | 39.85 | 19.64 | 2.83 |
| Phenolic resin 2 (phenol phenylene aralkyl resin) (mass %) | 19.01 | 8.59 | 5.00 | 21.25 | 29.80 | 14.69 | 1.61 |
| Epoxy resin 3 (cresol novolac epoxy resin) (mass %) | — | — | — | — | — | — | — |
| Epoxy resin 5 (bisphenol A type epoxy resin 2) (mass %) | — | — | — | — | — | — | — |
| Epoxy resin 6 (phenolic novolac epoxy resin) (mass %) | — | 13.62 | 19.44 | 23.17 | — | — | 25.49 |
| Phenolic resin 3 (phenolic novolac resin) (mass %) | — | 8.59 | 11.66 | — | — | — | 14.49 |
| Dicyandiamide (mass %) | — | — | — | — | — | — | — |
| Aluminum hydroxide B (mass %) | 55 | 55 | 55 | 55 | 30 | 65 | 55 |
| Silane coupling agent B (mass %) | 0.55 | 0.55 | 0.55 | 0.55 | 0.30 | 0.65 | 0.55 |

TABLE 11-continued

|  | Examples | | | | | | |
| --- | --- | --- | --- | --- | --- | --- | --- |
|  | 31 | 32 | 33 | 34 | 35 | 36 | 37 |
| Curing accelerator catalyst B (mass %) | 0.03 | 0.03 | 0.03 | 0.03 | 0.05 | 0.02 | 0.03 |
| Total weight of resin composition (mass %) | 100 | 100 | 100 | 100 | 100 | 100 | 100 |
| Layers of glass cloth | 7 | 7 | 7 | 7 | 7 | 7 | 7 |
| Glass cloth content (mass %)/total weight of laminate | 43 | 43 | 43 | 43 | 48 | 42 | 43 |
| Properties | | | | | | | |
| Flame retardancy | | | | | | | |
| Rating | V-0 | V-0 | V-0 | V-0 | V-1 | V-0 | V-0 |
| Flame-remaining time (seconds) | 22 | 25 | 30 | 27 | 70 | 16 | 40 |
| Dielectric constant | ○ | ○ | ○ | ○ | ○ | ○ | ○ |
| Moldability | ○ | ○ | ○ | ○ | ○ | ○ | ○ |
| Soldering heat resistance | ○ | ○ | ○ | ○ | ○ | ○ | ○ |
| High-temperature bending strength (MPa) | 70 | 85 | 90 | 84 | 58 | 74 | 92 |
| σ | ○ | ○ | ○ | ○ | ○ | ○ | ○ |
| High-temperature flexural modulus (GPa) | 6.5 | 7.7 | 8.2 | 7.6 | 4.5 | 7.1 | 9.0 |
| E | ○ | ○ | ○ | ○ | ○ | ○ | ○ |
| Amount of thermal decomposition products other than water (mass %) | 32 | 35 | 37 | 36 | 34 | 31 | 41 |
| F | ○ | ○ | ○ | ○ | ○ | ○ | ○ |
| Amount of water vapor generated (mass %)/total weight of laminate | 10 | 10 | 10 | 10 | 5 | 12 | 10 |
| V | ○ | ○ | ○ | ○ | ○ | ○ | ○ |

TABLE 12

|  | Examples | | | | | |
| --- | --- | --- | --- | --- | --- | --- |
|  | 38 | 39 | 40 | 41 | 42 | 43 |
| Resin composition | | | | | | |
| Epoxy resin 1 (phenol biphenyl aralkyl epoxy resin) (mass %) | — | — | — | — | 25.25 | 13.67 |
| Phenolic resin 1 (phenol biphenyl aralkyl resin) (mass %) | — | — | — | — | 19.17 | 8.54 |
| Epoxy resin 2 (phenol phenylene aralkyl epoxy resin) (mass %) | 34.07 | 2.85 | 39.85 | 25.41 | — | — |
| Phenolic resin 2 (phenol phenylene aralkyl resin) (mass %) | 25.49 | 1.59 | 29.80 | 19.01 | — | — |
| Epoxy resin 3 (cresol novolac epoxy resin) (mass %) | — | 25.65 | — | — | — | — |
| Epoxy resin 5 (bisphenol A type epoxy resin 2) (mass %) | — | — | — | — | — | — |
| Epoxy resin 6 (phenolic novolac epoxy resin) (mass %) | — | — | — | — | — | 13.67 |
| Phenolic resin 3 (phenolic novolac resin) (mass %) | — | 14.33 | — | — | — | 8.54 |
| Dicyandiamide (mass %) | — | — | — | — | — | — |
| Aluminum hydroxide B (mass %) | 40 | 55 | 30 | 55 | 55 | 55 |
| Silane coupling agent B (mass %) | 0.4 | 0.55 | 0.30 | 0.55 | 0.55 | 0.55 |
| Curing accelerator catalyst B (mass %) | 0.04 | 0.03 | 0.05 | 0.03 | 0.03 | 0.03 |
| Total weight of resin composition (mass %) | 100 | 100 | 100 | 100 | 100 | 100 |
| Layers of glass cloth | 7 | 7 | 5 | 8 | 7 | 7 |
| Glass cloth content (mass %)/total weight of laminate | 45 | 43 | 40 | 52 | 43 | 43 |
| Properties | | | | | | |
| Flame retardancy | | | | | | |
| Rating | V-1 | V-0 | V-0 | V-0 | V-0 | V-0 |
| Flame-remaining time (seconds) | 60 | 48 | 75 | 20 | 10 | 14 |
| Dielectric constant | ○ | ○ | ○ | ○ | ○ | ○ |
| Moldability | ○ | ○ | ○ | ○ | ○ | ○ |
| Soldering heat resistance | ○ | ○ | ○ | ○ | ○ | ○ |
| High-temperature bending strength (MPa) | 63 | 98 | 48 | 70 | 77 | 94 |
| σ | ○ | ○ | ○ | ○ | ○ | ○ |
| High-temperature flexural modulus (GPa) | 5.3 | 9.5 | 3.3 | 8.7 | 5.8 | 6.9 |
| E | ○ | ○ | ○ | ○ | ○ | ○ |
| Amount of thermal decomposition products other than water (mass %) | 33 | 43 | 34 | 32 | 31 | 34 |
| F | ○ | ○ | ○ | ○ | ○ | ○ |
| Amount of water vapor generated (mass %)/total weight of laminate | 7 | 10 | 6 | 8 | 10 | 10 |
| V | ○ | ○ | ○ | ○ | ○ | ○ |

TABLE 13

| | Comparative Examples | | | | | | |
|---|---|---|---|---|---|---|---|
| | 18 | 19 | 20 | 21 | 22 | 23 | 24 |
| Resin composition | | | | | | | |
| Epoxy resin 2 (phenol phenylene aralkyl epoxy resin) (mass %) | — | — | — | — | — | — | 25.41 |
| Phenolic resin 2 (phenol phenylene aralkyl resin (mass %) | — | — | — | — | — | — | 19.01 |
| Epoxy resin 3 (cresol novolac epoxy resin) (mass %) | — | — | — | — | — | — | — |
| Epoxy resin 5 (bisphenol A type epoxy resin 2) (mass %) | 36.18 | 13.31 | 42.46 | 18.88 | 95.56 | 27.98 | — |
| Epoxy resin 6 (phenolic novolac epoxy resin) (mass %) | — | 18.05 | — | 22.18 | — | — | — |
| Phenolic resin 3 (phenolic novolac resin) (mass %) | 8.18 | 13.00 | — | — | — | — | — |
| Dicyandiamide (mass %) | — | — | 1.89 | 3.29 | 4.24 | 1.25 | — |
| Aluminum hydroxide B (mass %) | 55 | 55 | 55 | 55 | 0 | 70 | — |
| Fused crushed silica | — | — | — | — | — | — | 55 |
| Silane coupling agent B (mass %) | 0.55 | 0.55 | 0.55 | 0.55 | — | 0.70 | 0.55 |
| Curing accelerator catalyst B (mass %) | 0.09 | 0.09 | 0.10 | 0.10 | 0.20 | 0.07 | 0.03 |
| Total weight of resin composition (mass %) | 100 | 100 | 100 | 100 | 100 | 100 | 100 |
| Layers of glass cloth | 7 | 7 | 7 | 7 | 7 | 7 | 7 |
| Glass cloth content (mass %)/total weight of laminate | 43 | 43 | 43 | 43 | 50 | 40 | 43 |
| Properties | | | | | | | |
| Flame retardancy | | | | | | | |
| Rating | V-1 | V-1 | NOT V-2 | V-1 | NOT V-2 | V-1 | V-1 |
| Flame-remaining time (seconds) | 190 | 130 | >250 | 200 | >250 | 180 | 105 |
| Dielectric constant | ○ | ○ | ○ | ○ | ○ | Δ | ○ |
| Moldability | ○ | ○ | ○ | ○ | ○ | Δ | ○ |
| Soldering heat resistance | ○ | ○ | ○ | ○ | ○ | Δ | ○ |
| High-temperature bending strength (MPa) | 46 | 73 | 37 | 68 | 27 | 48 | 75 |
| σ | ○ | ○ | x | ○ | x | ○ | ○ |
| High-temperature flexural modulus (GPa) | 3.7 | 6.3 | 1.7 | 5.3 | 0.2 | 3.4 | 7.0 |
| E | ○ | ○ | x | ○ | x | ○ | ○ |
| Amount of thermal decomposition products other than water (mass %) | 57 | 48 | 56 | 52 | 57 | 55 | 34 |
| F | x | x | x | x | x | x | ○ |
| Amount of water vapor generated (mass %)/total weight of laminate | 10 | 10 | 10 | 10 | 0 | 14 | 0 |
| V | ○ | ○ | ○ | ○ | x | x | x |

TABLE 14

| | Reference Examples | | | | | |
|---|---|---|---|---|---|---|
| | 25 | 26 | 27 | 28 | 29 | 30 |
| Resin composition | | | | | | |
| Epoxy resin 2 (phenol phenylene aralkyl epoxy resin) (mass %) | 42.73 | 57.16 | — | — | 42.73 | 13.86 |
| Phenolic resin 2 (phenol phenylene aralkyl resin (mass %) | 31.97 | 42.77 | — | — | 31.97 | 10.37 |
| Epoxy resin 3 (cresol novolac epoxy resin) (mass %) | — | — | — | — | — | — |
| Epoxy resin 5 (bisphenol A type epoxy resin 2) (mass %) | — | — | 85.91 | 42.46 | — | — |
| Epoxy resin 6 (phenolic novolac epoxy resin) (mass %) | — | — | — | — | — | — |
| Phenolic resin 3 (phenolic novolac resin) (mass %) | — | — | — | — | — | — |
| Dicyandiamide (mass %) | — | — | 3.81 | 1.89 | — | — |
| Aluminum hydroxide B (mass %) | 25 | 0 | 10 | 55 | 25 | 75 |
| Fused crushed silica | — | — | — | — | — | — |
| Silane coupling agent B (mass %) | 0.25 | — | 0.10 | 0.55 | 0.25 | 0.75 |
| Curing accelerator catalyst B (mass %) | 0.05 | 0.07 | 0.18 | 0.10 | 0.05 | 0.02 |
| Total weight of resin composition (mass %) | 100 | 100 | 100 | 100 | 100 | 100 |
| Layers of glass cloth | 5 | 5 | 7 | 8 | 8 | 7 |
| Glass cloth content (mass %)/total weight of laminate | 41 | 42 | 49 | 52 | 56 | 38 |
| Properties | | | | | | |
| Flame retardancy | | | | | | |
| Rating | V-1 | V-1 | NOT V-2 | NOT V-2 | V-1 | V-0 |
| Flame-remaining time (seconds) | 120 | 215 | >250 | 250 | 115 | 9 |
| Dielectric constant | ○ | ○ | ○ | ○ | ○ | Δ |
| Moldability | ○ | ○ | ○ | ○ | ○ | Δ |
| Soldering heat resistance | ○ | ○ | ○ | ○ | ○ | Δ |

TABLE 14-continued

|  | Reference Examples | | | | | |
|---|---|---|---|---|---|---|
|  | 25 | 26 | 27 | 28 | 29 | 30 |
| High-temperature bending strength (MPa) | 42 | 40 | 29 | 38 | 42 | 80 |
| σ | x | x | x | x | x | ○ |
| High-temperature flexural modulus (GPa) | 2.7 | 2.0 | 0.5 | 4.4 | 4.9 | 8.1 |
| E | x | x | x | ○ | ○ | ○ |
| Amount of thermal decomposition products other than water (mass %) | 33 | 35 | 56 | 56 | 33 | 29 |
| F | ○ | ○ | x | x | ○ | ○ |
| Amount of water vapor generated (mass %)/total weight of laminate | 5 | 0 | 2 | 8 | 4 | 15 |
| V | ○ | x | x | ○ | ○ | x |

INDUSTRIAL APPLICABILITY

As described above, the flame-retardant epoxy resin composition of the present invention comprises a phenolic resin (C) containing, in the molecular chain, structural units derived from a phenol (A) and structural units derived from an aromatic compound (B) and/or an epoxy resin (D) obtained by subjecting the phenolic hydroxyl groups of the phenolic resin (C) to etherification with glycidyl, and further comprises a metal hydroxide. Therefore, the composition can express high flame retardancy and safety, both unobtainable with the prior art. When used particularly in production of a laminate, the composition can allow the laminate to have high flame retardancy while maintaining the properties required for the laminate, such as processability, dielectric properties, moisture resistance, soldering heat resistance and the like, at satisfactory levels.

What is claimed is:

1. A flame-retardant epoxy resin composition comprising an epoxy resin, a curing agent, a metal hydroxide, and a silicone compound of a branched structure main chain having an aromatic-derived group, wherein the curing agent is a phenolic resin (C) containing, in a molecular chain, a structural unit derived from a phenol (A) and a structural unit derived from an aromatic compound (B) other than the phenol (A).

2. A flame-retardant epoxy resin composition according to claim 1, wherein the aromatic compound (B) is a compound selected from the group consisting of biphenyl and its derivatives, benzene and its derivatives, diphenyl ether and its derivatives, naphthalene and its derivatives, anthracene and its derivatives, fluorene and its derivatives, bisphenol fluorene and its derivatives, bisphenol S and its derivatives, bisphenol F and its derivatives and bisphenol A and its derivatives.

3. A flame-retardant epoxy resin composition according to claim 1, wherein the phenolic resin (C) has a recurring unit represented by either of the following formulas (I) to (IV):

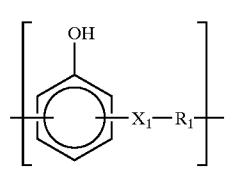
(I)

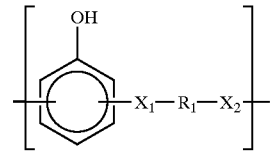
(II)

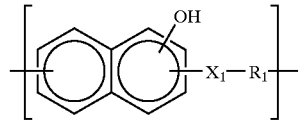
(III)

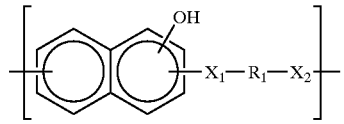
(IV)

(wherein $X_1$ and $X_2$ are each independently a $C_{1-6}$ unsaturated chain structure linking group, or a $C_{1-6}$ substituted or unsubstituted alkylene group; and $R_1$ is a phenylene group, a biphenylene group or a group derived from these groups).

4. A flame-retardant epoxy resin composition according to claim 1, wherein a content of the metal hydroxide is 10% by mass to 70% by mass relative to a total amount of the flame-retardant epoxy resin composition.

5. A flame-retardant epoxy resin composition according to claim 1, wherein a content of the metal hydroxide is 5% by mass to 70% by mass relative to a total amount of the flame-retardant epoxy resin composition.

6. A flame-retardant epoxy resin composition according to claim 1, wherein the silicone compound contains a unit (T unit) represented by the formula $RSiO_{1.5}$.

7. A flame-retardant epoxy resin composition according to claim 1, wherein the silicone compound contains a group reactive with the epoxy resin and/or the curing agent.

8. A flame-retardant epoxy resin composition according to claim 7, wherein the reactive group is hydroxyl group, $C_{1-5}$ alkoxy group, epoxy group or carboxyl group.

9. A flame-retardant epoxy resin composition according to claim 1, impregnated and cured into a substrate of a laminate.

10. A flame-retardant epoxy resin composition according to claim 1, wherein the metal hydroxide is a metal oxide containing at least one element selected from the group consisting of aluminum, magnesium, zinc, boron, calcium, nickel, cobalt, tin, molybdenum, copper, iron and titanium.

11. A flame-retardant epoxy resin composition according to claim 10, wherein the metal hydroxide is aluminum hydroxide, magnesium hydroxide or zinc borate.

12. An epoxy resin varnish solution obtained by dispersing the flame-retardant epoxy resin composition set forth in claim 1, in an organic solvent.

13. A prepreg obtained by impregnating the flame-retardant epoxy resin composition set forth in claim 1, into a substrate and curing the impregnated composition.

14. A flame-retardant epoxy resin composition comprising an epoxy resin, a curing agent, a metal hydroxide, and a silicone compound of a branched structure main chain having an aromatic-derived group,
wherein the epoxy resin is a novolac epoxy resin (D) obtained by glycidyletherifying a phenolic hydroxyl group of a phenolic resin (C) containing, in a molecular chain, a structural unit derived from a phenol (A) and a structural unit derived from an aromatic compound (B) other than the phenol (A).

15. A flame-retardant epoxy resin composition according to claim 14, wherein the aromatic compound (B) is a compound selected from the group consisting of biphenyl and its derivatives, benzene and its derivatives, diphenyl ether and its derivatives, naphthalene and its derivatives, anthracene and its derivatives, fluorene and its derivatives, bisphenol fluorene and its derivatives, bisphenol S and its derivatives, bisphenol F and its derivatives and bisphenol A and its derivatives.

16. A lame-retardant epoxy resin composition according to claim 14, wherein the phenolic resin (C) has a recurring unit represented by either of the following formulas (I) to (IV):

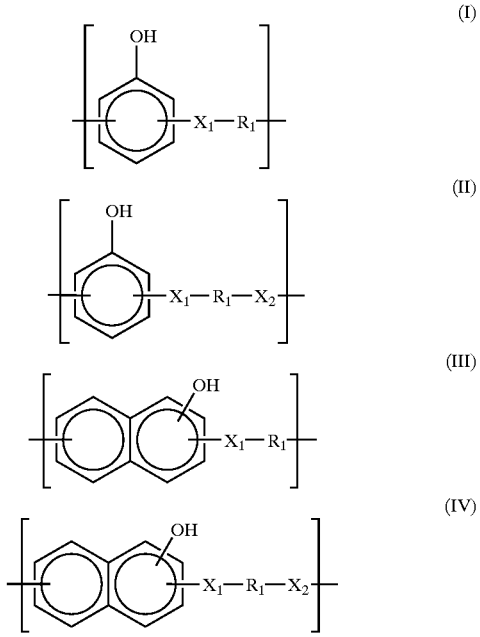

(wherein $X_1$ and $X_2$ are each independently a $C_{1-6}$ unsaturated chain structure linking group, or a $C_{1-6}$ substituted or unsubstituted alkylene group; and $R_1$ is a phenylene group, a biphenylene group or a group derived from these groups).

17. A flame-retardant epoxy resin composition according to claim 14, wherein a content of the metal hydroxide is 10% by mass to 70% by mass relative to a total amount of the flame-retardant epoxy resin composition.

18. A flame-retardant epoxy resin composition according to claim 14, wherein a content of the metal hydroxide is 5% by mass to 70% by mass relative to a total amount of the flame-retardant epoxy resin composition.

19. A flame-retardant epoxy resin composition according to claim 14, wherein the silicone compound contains a unit (T unit) represented by the formula $RSiO_{1.5}$.

20. A flame-retardant epoxy resin composition according to claim 14, wherein the silicone compound contains a group reactive with the epoxy resin and/or the curing agent.

21. A flame-retardant epoxy resin composition according to claim 20, wherein the reactive group is hydroxyl group, $C_{1-5}$ alkoxy group, epoxy group or carboxyl group.

22. A flame-retardant epoxy resin composition according to claim 14, impregnated and cured into a substrate of a laminate.

23. A flame-retardant epoxy resin composition according to claim 14, wherein the metal hydroxide is a metal oxide containing at least one element selected from the group consisting of aluminum, magnesium, zinc, boron, calcium, nickel, cobalt, tin, molybdenum, copper, iron and titanium.

24. A flame-retardant epoxy resin composition according to claim 23, wherein the metal hydroxide is aluminum hydroxide, magnesium hydroxide or zinc borate.

25. An epoxy resin varnish solution obtained by dispersing the flame-retardant epoxy resin composition set forth in claim 14, in an organic solvent.

26. A prepreg obtained by impregnating the flame-retardant epoxy resin composition set forth in claim 14, into a substrate and curing the impregnated composition.

27. A flame-retardant epoxy resin composition comprising an epoxy resin, a curing agent, a metal hydroxide, and a silicone compound of a branched structure main chain having an aromatic-derived group,
wherein the curing agent is a phenolic resin (C) containing, in a molecular chain, a structural unit derived from a phenol (A) and a structural unit derived from an aromatic compound (B) other than the phenol (A), and
the epoxy resin is a novolac epoxy resin (D) obtained by glycidyletherifying a phenolic hydroxyl group of a phenolic resin (C') containing, in a molecular chain, a structural unit derived from a phenol (A') and a structural unit derived from an aromatic compound (B') other than the phenol (A').

28. A flame-retardant epoxy resin composition according to claim 27, wherein the aromatic compound (B) is a compound selected from the group consisting of biphenyl and its derivatives, benzene and its derivatives, diphenyl ether and its derivatives, naphthalene and its derivatives, anthracene and its derivatives, fluorene and its derivatives, bisphenol fluorene and its derivatives, bisphenol S and its derivatives, bisphenol F and its derivatives and bisphenol A and its derivatives.

29. A flame-retardant epoxy resin composition according to claim 27, wherein the phenolic resin (C) has a recurring unit represented by either of the following formulas (I) to (IV):

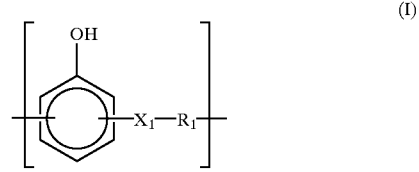

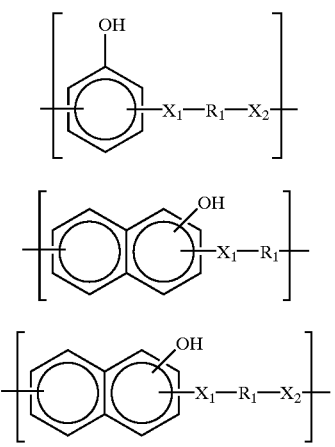

wherein $X_1$ and $X_2$ are each independently a $C_{1-6}$ unsaturated chain structure linking group, or a $C_{1-6}$ substituted or unsubstituted alkylene group; and $R_1$ is a phenylene group, a biphenylene group or a group derived from these groups).

30. A flame-retardant epoxy resin composition according to claim 27, wherein a content of the metal hydroxide is 10% by mass to 70% by mass relative to a total amount of the flame-retardant epoxy resin composition.

31. A flame-retardant epoxy resin composition according to claim 27, wherein a content of the metal hydroxide is 5% by mass to 70% by mass relative to a total amount of the flame-retardant epoxy resin composition.

32. A flame-retardant epoxy resin composition according to claim 27, wherein the silicone compound contains a unit (T unit) represented by the formula $RSiO_{1.5}$.

33. A flame-retardant epoxy resin composition according to claim 27, wherein the silicone compound contains a group reactive with the epoxy resin and/or the curing agent.

34. A flame-retardant epoxy resin composition according to claim 33, wherein the reactive group is hydroxyl group, $C_{1-5}$ alkoxy group, epoxy group or carboxyl group.

35. A flame-retardant epoxy resin composition according to claim 27, impregnated and cured into a substrate of a laminate.

36. A flame-retardant epoxy resin composition according to claim 27, wherein the metal hydroxide is a metal hydroxide containing at least one element selected from the group consisting of aluminum, magnesium, zinc, boron, calcium, nickel, cobalt, tin, molybdenum, copper, iron and titanium.

37. A flame-retardant epoxy resin composition according to claim 36, wherein the metal hydroxide is aluminum hydroxide, magnesium hydroxide or zinc borate.

38. An epoxy resin varnish solution obtained by dispersing the flame-retardant epoxy resin composition set forth in claim 27, in an organic solvent.

39. A prepreg obtained by impregnating the flame-retardant epoxy resin composition set forth in claim 27, into a substrate and curing the impregnated composition.

40. A laminate obtained by impregnating a flame-retardant epoxy resin composition comprising an epoxy resin, a curing agent, a metal hydroxide, and a silicone compound of a branched structure main chain having an aromatic-derived group, into a substrate, curing the impregnated composition to obtain a prepreg, laminating a plurality of the prepregs, and hot-pressing them, wherein the curing agent is a phenolic resin (C) containing, in a molecular chain, a structural unit derived from a phenol (A) and a structural unit derived from an aromatic compound (B) other than the phenol (A).

41. A laminate according to claim 40, wherein the aromatic compound (B) is a compound selected from the group consisting of biphenyl and its derivatives, benzene and its derivatives, diphenyl ether and its derivatives, naphthalene and its derivatives, anthracene and its derivatives, fluorene and its derivatives, bisphenol fluorene and its derivatives, bisphenol S and its derivatives, bisphenol F and its derivatives and bisphenol A and its derivatives.

42. A laminate according to claim 40, wherein the phenolic resin (C) has a recurring unit represented by either of the following formulas (I) to (IV):

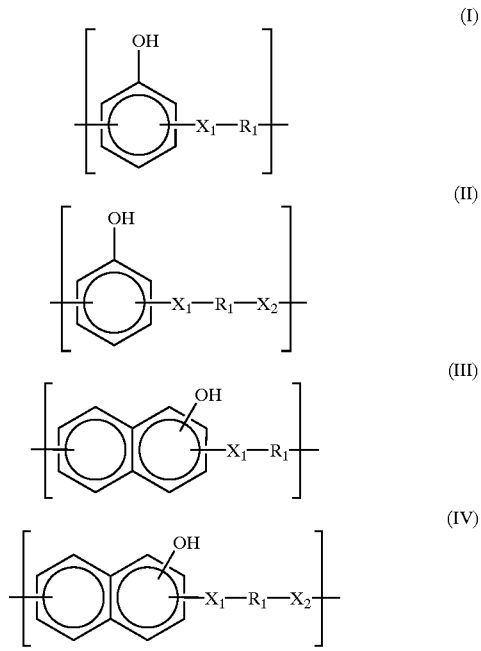

(wherein $X_1$ and $X_2$ are each independently a $C_{1-6}$ unsaturated chain structure linking group, or a $C_{1-6}$ substituted or unsubstituted alkylene group; and $R_1$ is a phenylene group, a biphenylene group or a group derived from these groups).

43. A laminate according to claim 40, wherein a content of the metal hydroxide is 5% by mass to 70% by mass relative to a total amount of the flame-retardant epoxy resin composition.

44. A laminate according to claim 40, wherein the silicone compound contains a unit (T unit) represented by the formula $RSiO_{1.5}$.

45. A laminate according to claim 40, wherein the silicone compound contains a group reactive with the epoxy resin and/for the curing agent.

46. A laminate according to claim 45, wherein the reactive group is hydroxyl group, $C_{1-5}$ alkoxy group, epoxy group or carboxyl group.

47. A laminate according to claim 40, wherein the metal hydroxide is a metal oxide containing at least one element selected from the group consisting of aluminum, magnesium, zinc, boron, calcium, nickel, cobalt, tin, molybdenum, copper, iron and titanium.

48. A laminate according to claim 40, wherein the metal hydroxide is aluminum hydroxide, magnesium hydroxide or zinc borate.

49. A laminate obtained by impregnating a flame-retardant epoxy resin composition comprising an epoxy resin, a curing agent, a metal hydroxide, and a silicone compound of a branched structure main chain having an aromatic-derived group, into a substrate, curing the impregnated composition to obtain a prepreg, laminating a plurality of the prepregs, and hot-pressing them, wherein the epoxy resin is a novolac epoxy resin (D) obtained by glycidyletherifying a phenolic hydroxyl group of a phenolic resin (C) containing, in a molecular chain, a structural unit derived from a phenol (A) and a structural unit derived from an aromatic compound (B) other than the phenol (A).

50. A laminate according to claim 49, wherein the aromatic compound (B) is a compound selected from the group consisting of biphenyl and its derivatives, benzene and its derivatives, diphenyl ether and its derivatives, naphthalene and its derivatives, anthracene and its derivatives, fluorene and its derivatives, bisphenol fluorene and its derivatives, bisphenol S and its derivatives, bisphenol F and its derivatives and bisphenol A and its derivatives.

51. A laminate according to claim 49, wherein the phenolic resin (C) has a recurring unit represented by either of the following formulas (I) to (IV):

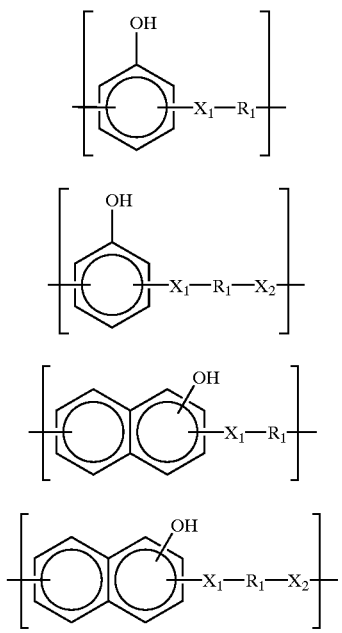

(wherein $X_1$ and $X_2$ are each independently a $C_{1-6}$ unsaturated chain structure linking group, or a $C_{1-6}$ substituted or unsubstituted alkylene group; and $R_1$ is a phenylene group, a biphenylene group or a group derived from these groups).

52. A laminate according to claim 49, wherein a content of the metal hydroxide is 5% by mass to 70% by mass relative to a total amount of the flame-retardant epoxy resin composition.

53. A laminate according to claim 49, wherein the silicone compound contains a unit (T unit) represented by the formula $RSiO_{1.5}$.

54. A laminate according to claim 49, wherein the silicone compound contains a group reactive with the epoxy resin and/or the curing agent.

55. A laminate according to claim 54, wherein the reactive group is hydroxyl group, $C_{1-5}$ alkoxy group, epoxy group or carboxyl group.

56. A laminate according to claim 49, wherein the metal hydroxide is a metal oxide containing at least one element selected from the group consisting of aluminum, magnesium, zinc, boron, calcium, nickel, cobalt, tin, molybdenum, copper, iron and titanium.

57. A laminate according to claim 49, wherein the metal hydroxide is aluminum hydroxide, magnesium hydroxide or zinc borate.

58. A laminate obtained by impregnating a flame-retardant epoxy resin composition comprising an epoxy resin, a curing agent, a metal hydroxide, and a silicone compound of a branched structure main chain having an aromatic-derived group, into a substrate, curing the impregnated composition to obtain a prepreg, laminating a plurality of the prepregs, and hot-pressing them, wherein the curing agent is a phenolic resin (C) containing, in a molecular chain, a structural unit derived from a phenol (A) and a structural unit derived from an aromatic compound (B) other than the phenol (A), and the epoxy resin is a novolac epoxy resin (D) obtained by glycidyletherifying a phenolic hydroxyl group of a phenolic resin (C') containing, in a molecular chain, a structural unit derived from a phenol (A') and a structural unit derived from an aromatic compound (B') other than the phenol (A').

59. A laminate according to claim 58, wherein the aromatic compound (B) is a compound selected from the group consisting of biphenyl and its derivatives, benzene and its derivatives, diphenyl ether and its derivatives, naphthalene and its derivatives, anthracene and its derivatives, fluorene and its derivatives, bisphenol fluorene and its derivatives, bisphenol S and its derivatives, bisphenol F and its derivatives and bisphenol A and its derivatives.

60. A laminate according to claim 58, wherein the phenolic resin (C) has a recurring unit represented by either of the following formulas (I) to (IV):

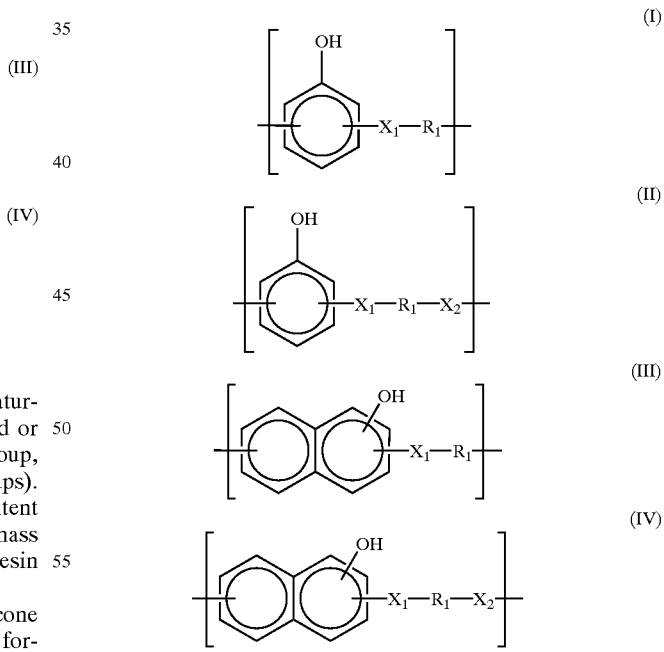

(wherein $X_1$ and $X_2$ are each independently a $C_{1-6}$ unsaturated chain structure linking group, or a $C_{1-6}$ substituted or unsubstituted alkylene group; and $R_1$ is a phenylene group, a biphenylene group or a group derived from these groups).

61. A laminate according to claim 58, wherein a content of the metal hydroxide is 5% by mass to 70% by mass relative to a total amount of the flame-retardant epoxy resin composition.

62. A laminate according to claim 58, wherein the silicone compound contains a unit (T unit) represented by the formula $RSiO_{1.5}$.

63. A laminate according to claim 58, wherein the silicone compound contains a group reactive with the epoxy resin and/or the curing agent.

64. A laminate according to claim 63, wherein the reactive group is hydroxyl group, $C_{1-5}$ alkoxy group, epoxy group or carboxyl group.

65. A laminate according to claim 58, wherein the metal hydroxide is a metal oxide containing at least one element selected from the group consisting of aluminum, magnesium, zinc, boron, calcium, nickel, cobalt, tin, molybdenum, copper, iron and titanium.

66. A laminate according to claim 58, wherein the metal hydroxide is aluminum hydroxide, magnesium hydroxide or zinc borate.

67. A laminate obtained by impregnating a flame-retardant epoxy resin composition comprising an epoxy resin, a curing agent and a metal hydroxide, into a substrate, curing the impregnated composition to obtain a prepreg, laminating a plurality of the prepregs, and hot-pressing them, wherein the curing agent is a phenolic resin (C) containing, in a molecular chain, a structural unit derived from a phenol (A) and a structural unit derived from an aromatic compound (B) other than the phenol (A), wherein a content of the metal hydroxide is 10% by mass to 70% by mass relative to a total amount of the flame-retardant epoxy resin composition.

68. A laminate obtained by impregnating a flame-retardant epoxy resin composition comprising an epoxy resin, a curing agent and a metal hydroxide, into a substrate, curing the impregnated composition to obtain a prepreg, laminating a plurality of the prepregs, and hot-pressing them, wherein the epoxy resin is a novolac epoxy resin (D) obtained by glycidyletherifying a phenolic hydroxyl group of a phenolic resin (C) containing, in a molecular chain, a structural unit derived from a phenol (A) and a structural unit derived from an aromatic compound (B) other than the phenol (A), wherein a content of the metal hydroxide is 10% by mass to 70% by mass relative to a total amount of the flame-retardant epoxy resin composition.

69. A laminate obtained by impregnating a flame-retardant epoxy resin composition comprising an epoxy resin, a curing agent and a metal hydroxide, into a substrate, curing the impregnated composition to obtain a prepreg, laminating a plurality of the prepregs, and hot-pressing them, wherein the curing agent is a phenolic resin (C) containing, in a molecular chain, a structural unit derived from a phenol (A) and a structural unit derived from an aromatic compound (B) other than the phenol (A), and the epoxy resin is a novolac epoxy resin (D) obtained by glycidyletherifying a phenolic hydroxyl group of a phenolic resin (C') containing, in a molecular chain, a structural unit derived from a phenol (A') and a structural unit derived from an aromatic compound (B') other than the phenol (A'), wherein a content of the metal hydroxide is 10% by mass to 70% by mass relative to a total amount of the flame-retardant epoxy resin composition.

70. A laminate obtained by impregnating a flame-retardant epoxy resin composition comprising an epoxy resin, a curing agent and a metal hydroxide, into a substrate, curing the impregnated composition to obtain a prepreg, laminating a plurality of the prepregs, and hot-pressing them, wherein the curing agent is a phenolic resin (C) containing, in a molecular chain, a structural unit derived from a phenol (A) and a structural unit derived from an aromatic compound (B) other than the phenol (A), which satisfies the following conditions (a) to (d):

(a) $45 \leq \sigma \leq 100$, $3 \leq E \leq 12$

[wherein $\sigma$ is a bending strength (MPa) of the laminate at $230 \pm 10°$ C. and E is a flexural modulus (GPa) of the laminate at $230 \pm 10°$ C.], (b) $30 \leq G \leq 60$

[wherein G is a proportion (mass %) of the substrate in a total amount of the laminate], (c) $F \leq 45$ (mass %), F (mass %)=$R \times 100/X$ (wherein R is an amount of a thermal decomposition product other than water, generating from a room temperature to 500° C., and X is a content of the resin in the laminate), and (d) $4 \leq V \leq 13$

[wherein V is an amount (V mass %) of a water vapor generating from a room temperature to 500° C., relative to a total amount of the laminate, when the laminate is subjected to thermal decomposition at a temperature elevation rate of 10° C./min at an air flow rate of 0.2 liter/min].

71. A laminate obtained by impregnating a flame-retardant epoxy resin composition comprising an epoxy resin, a curing agent and a metal hydroxide, into a substrate, curing the impregnated composition to obtain a prepreg, laminating a plurality of the prepregs, and hot-pressing them, wherein the epoxy resin is a novolac epoxy resin (D) obtained by glycidyletherifying a phenolic hydroxyl group of a phenolic resin (C) containing, in a molecular chain, a structural unit derived from a phenol (A) and a structural unit derived from an aromatic compound (B) other than the phenol (A), which satisfies the following conditions (a) to (d)

(a) $45 \leq \sigma 100$, $3 \leq E \leq 12$

[wherein $\sigma$ is a bending strength (MPa) of the laminate at $230 \pm 10°$ C. and E is a flexural modulus (GPa) of the laminate at $230 \pm 10°$ C.], (b) $30 \leq G \leq 60$

[wherein G is a proportion (mass %) of the substrate in a total amount of the laminate], (c) $F \leq 45$ (mass %), F (mass %)=$R \times 100/X$ (wherein R is an amount of a thermal decomposition product other than water, generating from a room temperature to 500° C., and X is a content of the resin in the laminate), and (d) $4 \leq V \leq 13$

[wherein V is an amount (V mass %) of a water vapor generating from a room temperature to 500° C., relative to a total amount of the laminate, when the laminate is subjected to thermal decomposition at a temperature elevation rate of 10° C./min at an air flow rate of 0.2 liter/min].

72. A laminate obtained by impregnating a flame-retardant epoxy resin composition comprising an epoxy resin, a curing agent and a metal hydroxide, into a substrate, curing the impregnated composition to obtain a prepreg, laminating a plurality of the prepregs, and hot-pressing them, wherein the curing agent is a phenolic resin (C) containing, in a molecular chain, a structural unit derived from a phenol (A) and a structural unit derived from an aromatic compound (B) other than the phenol (A), and the epoxy resin is a novolac epoxy resin (D) obtained by glycidyletherifying a phenolic hydroxyl group of a phenolic resin (C') containing, in a molecular chain, a structural unit derived from a phenol (A') and a structural unit derived from an aromatic compound (B') other than the phenol (A'), which satisfies the following conditions (a) to (d):

(a) $45 \leq \sigma \leq 100$, $3 \leq E \leq 12$
[wherein $\sigma$ is a bending strength (MPa) of the laminate at $230 \pm 10°$ C. and E is a flexural modulus (GPa) of the laminate at $230 \pm 10°$ C.], (b) $30 \leq G \leq 60$
[wherein G is a proportion (mass %) of the substrate in a total amount of the laminate], (c) $F \leq 45$ (mass %), F (mass %)=R×100/X
(wherein R is an amount of a thermal decomposition product other than water, generating from a room temperature to 500° C., and X is a content of the resin in the laminate), and (d) $4 \leq V \leq 13$
[wherein V is an amount (V mass %) of a water vapor generating from a room temperature to 500° C., relative to a total amount of the laminate, when the laminate is subjected to thermal decomposition at a temperature elevation rate of 10° C./min at an air flow rate of 0.2 liter/min].

* * * * *